(12) United States Patent
Thangarasa et al.

(10) Patent No.: US 11,516,735 B2
(45) Date of Patent: Nov. 29, 2022

(54) SYSTEMS AND METHODS FOR ADAPTIVELY MONITORING DOWNLINK CONTROL CHANNEL IN DISCONTINUOUS RECEPTION

(71) Applicant: Telefonaktiebolaget LM Ericsson (publ), Stockholm (SE)

(72) Inventors: Santhan Thangarasa, Vallingby (SE); Muhammad Kazmi, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 24 days.

(21) Appl. No.: 16/636,847

(22) PCT Filed: Jul. 6, 2018

(86) PCT No.: PCT/SE2018/050747
§ 371 (c)(1),
(2) Date: Feb. 5, 2020

(87) PCT Pub. No.: WO2019/032009
PCT Pub. Date: Feb. 14, 2019

(65) Prior Publication Data
US 2020/0178172 A1 Jun. 4, 2020

Related U.S. Application Data

(60) Provisional application No. 62/544,177, filed on Aug. 11, 2017.

(51) Int. Cl.
*H04W 52/02* (2009.01)
*H04W 8/24* (2009.01)
(Continued)

(52) U.S. Cl.
CPC ......... *H04W 52/0216* (2013.01); *H04W 8/24* (2013.01); *H04W 24/08* (2013.01); *H04W 52/0235* (2013.01); *H04W 76/28* (2018.02)

(58) Field of Classification Search
CPC .............. H04W 52/0216; H04W 8/24; H04W 52/0235; H04W 52/02; H04W 24/08; H04W 76/28
See application file for complete search history.

(56) References Cited

U.S. PATENT DOCUMENTS

| 9,439,142 B2 * | 9/2016 | Zhu .............. H04W 52/0216 |
| 2018/0007734 A1 * | 1/2018 | Kela ............... H04W 52/0229 |
| 2020/0145921 A1 * | 5/2020 | Zhang .............. H04W 76/27 |

FOREIGN PATENT DOCUMENTS

| WO | 2016 178756 A1 | 11/2016 |
| WO | 2016 182530 A1 | 11/2016 |

(Continued)

OTHER PUBLICATIONS

3GPP TSG RAN Meeting #76; West Palm Beach, USA; Status Report To TSG; Work Item Name: Even further enhanced MTC for LTE; Source: Leading WG-RAN 1 (RP-171180)—Jun. 5, 2017.

(Continued)

*Primary Examiner* — Ayanah S George
(74) *Attorney, Agent, or Firm* — Baker Botts, LLP

(57) ABSTRACT

The disclosure relates to a method performed by a network node of a wireless communication network, and corresponding method in a UE. The method in the node comprises obtaining (312) information indicating a capability of a UE of applying a wake-up-signal, WUS. Applying the WUS implies that reception or non-reception of the WUS at the start of an on-duration of a discontinuous reception, DRX, period indicates to the UE to respectively monitor or refrain from monitoring a downlink control channel during the on-duration. The method also comprises obtaining (314) configuration data related to the UE, the configuration data comprising at least one of: a DRX cycle configuration; a type of service or application for which the UE is being (Continued)

used; and a UE coverage level; and determining (318) whether the UE is to apply the WUS based on the obtained configuration data.

16 Claims, 10 Drawing Sheets

(51) Int. Cl.
  *H04W 24/08* (2009.01)
  *H04W 76/28* (2018.01)

(56) References Cited

FOREIGN PATENT DOCUMENTS

| WO | 2017 100090 A1 | 6/2017 | |
|---|---|---|---|
| WO | WO-2017100090 A1 * | 6/2017 | ........ H04W 52/0216 |
| WO | 2017 134561 A1 | 8/2017 | |

OTHER PUBLICATIONS

PCT International Search Report for International application No. PCT/SE2018/050747—dated Nov. 19, 2018.
PCT Written Opinion of the International Searching Authority for International application No. PCT/SE2018/050747—dated Nov. 19, 2018.

* cited by examiner

SYSTEMS AND METHODS FOR ADAPTIVELY MONITORING DOWNLINK CONTROL CHANNEL IN DISCONTINUOUS RECEPTION

PRIORITY

This nonprovisional application is a U.S. National Stage Filing under 35 U.S.C. § 371 of International Patent Application Ser. No. PCT/SE2018/050747 flied Jul. 6, 2018 and entitled "SYSTEMS AND METHODS FOR ADAPTIVELY MONITORING DOWNLINK CONTROL CHANNEL IN DISCONTINOUS RECEPTION" which claims priority to U.S. Provisional Patent Application No. 62/544,177 filed Aug. 11, 2017 both of which are hereby incorporated by reference in their entirety.

TECHNICAL FIELD

The present disclosure relates, in general, to wireless communications and, more particularly, to systems and methods for adaptively monitoring downlink control channel in discontinuous reception (DRX).

BACKGROUND

Machine Type Communication (MTC) devices are expected to be of low cost and low complexity. A low complexity wireless device, such as a user equipment (UE), envisaged for machine-to-machine (M2M) operation may implement one or more low cost features such as, smaller downlink and uplink maximum transport block size such as, for example, 1000 bits. In the following description, the terms UE and wireless device will both be used to designate a device with a wireless interface for use in a wireless communication system. A UE may also implement a reduced downlink channel bandwidth of 1.4 MHz for a data channel such as physical downlink shared channel (PDSCH). A low-cost UE operating with half-duplex Frequency Division Duplex (HD-FDD) may include one or more of the following additional features: single receiver (1 Rx) at the UE, smaller downlink and/or uplink maximum transport block size (e.g. 1000 bits) and reduced downlink channel bandwidth of 1.4 MHz for data channel. The low-cost UE may also be termed as a low-complexity UE.

The path loss between a M2M device and the base station can be very large in some scenarios. For example, path loss may be large when the M2M device is used as a sensor or metering device located in a remote location such as in the basement of the building. In such scenarios, strong reception of signals from the base station may be very challenging. For example, the path loss can be 20 dB worse than for normal cellular network operation. In order to cope with such challenges, the coverage in uplink and/or in downlink has to be substantially enhanced. This may be realized by employing one or a plurality of advanced techniques in the UE and/or in the radio network node for enhancing the coverage. Some non-limiting examples of such advanced techniques are transmit power boosting, repetition of transmitted signal, applying additional redundancy to the transmitted signal, and use of advanced/enhanced receiver. In general, when employing such coverage enhancing techniques, the M2M is considered to be operating in a 'coverage enhancing mode'.

The normal coverage mode of operation is also called coverage enhanced mode A (CEModeA). However, a low complexity MTC UE such as, for example, a UE with 1 Rx and/or limited bandwidth, may also be capable of supporting enhanced coverage mode of operation, also known as coverage enhanced mode B (CEModeB).

The enhanced MTC (eMTC) or further enhanced MTC (FeMTC) UE can be configured via radio resource control (RRC) with either of the two possible coverage modes: CEModeA or CEModeB. These are also sometimes referred to as coverage enhancement (CE) levels. The CEModeA and CEModeB are associated with different number of repetitions used in downlink (DL) and/or uplink (UL) physical channels as signalled in the following RRC messages as provided in TS 36.331 v13.3.2:

```
PDSCH-ConfigCommon-v1310 ::=  SEQUENCE {
    pdsch-maxNumRepetitionCEmodeA-r13 ENUMERATED {
                                    r16, r32 }          OPTIONAL,  --
Need OR
    pdsch-maxNumRepetitionCEmodeB-r13 ENUMERATED {
                                    r192, r256, r384, r512, r768, r1024,
                                    r1536, r2048}       OPTIONAL   --
Need OR
}
``` where pdsch-maxNumRepetitionCEmodeA indicates the set of PDSCH repetition numbers for CE mode A and pdsch-maxNumRepetitionCEmodeB indicates the set of PDSCH repetition numbers for CE mode B, and

```
PUSCH-ConfigCommon-v1310 ::=  SEQUENCE {
    pusch-maxNumRepetitionCEmodeA-r13 ENUMERATED {
                                    r8, r16, r32 }      OPTIONAL,  --
Need OR
    pusch-maxNumRepetitionCEmodeB-r13 ENUMERATED {
                                    r192, r256, r384, r512, r768, r1024,
                                    r1536, r2048}       OPTIONAL,  --
Need OR
}
``` where pusch-maxNumRepetitionCEmodeA indicates the set of PUSCH repetition numbers for CE mode A and pusch-maxNumRepetitionCEmodeB indicates the set of PUSCH repetition numbers for CE mode B.

However, if the UE is not configured with either of CEModeA and CEModeB, then according to TS 36.211 v13.2.0, the UE shall assume the following CE level configuration:

if the PRACH coverage enhancement (CE) level is 0 or 1 then the UE shall assume CEModeA; or if the PRACH coverage enhancement (CE) level is 2 or 3 then UE shall assume CEModeB.

The UE may determine one of the four possible CE levels (0, 1, 2 and 3) during the random access procedure by comparing the DL radio measurement with the one or more thresholds signalled to the UE by the network node. For example, the UE may compare the reference signal received power (RSRP) measurement to a corresponding threshold.

In LTE, discontinuous reception (DRX) cycle is used to enable the UE to save its battery. The DRX cycle is used in an RRC idle state but can also be used in RRC connected state. Examples of lengths of DRX cycles currently used in RRC idle state are 320 ms, 640 ms, 1.28 s, and 2.56 s. Examples of lengths of DRX cycles currently used in RRC connected state may range from 2 ms to 2.56 s. Enhanced DRX (eDRX) cycles are expected to be very long. For example, eDRX cycles may range from several seconds to several minutes and may even last up to one or more hours. Typical values of eDRX cycles may be between 4 and 10 minutes.

The DRX cycle is configured by the network node and is characterized by the following parameters:

On-duration: During the on-duration of the DRX cycle, a timer called 'onDurationTimer', which is configured by the network node, is running. This timer specifies the number of consecutive control channel subframes (e.g. Physical DL Control Channel (PDCCH), and ePDCCH subframe(s)) at the beginning of a DRX Cycle, which may also interchangeably be referred to as DRX ON period. More specifically it is the duration in downlink subframes when the UE wakes up to receive the control channel (e.g. PDCCH, ePDCCH). If the UE successfully decodes the control channel (e.g. PDCCH, ePDCCH) during the On-duration then the UE starts a drx-inactivity timer (see below) and stays awake until its expiry. When the onDurationTimer is running the UE is considered to be in DRX state of the DRX cycle.

DRX-inactivity timer: It specifies the number of consecutive control channel (e.g. PDCCH, ePDCCH) subframe(s) after the subframe in which a control channel (e.g. PDCCH) indicates an initial UL or DL user data transmission for this MAC entity. It is also configured by the network node. When the drx-inactivity timer is running the UE is considered to be in non-DRX state i.e. no DRX is used.

Active time: This time is the duration during which the UE monitors the control channel (e.g. PDCCH, ePDCCH). In other words this is the total duration during which the UE is awake. This includes the "on-duration" of the DRX cycle, the time during which the UE is performing continuous reception while the inactivity timer has not expired and the time the UE is performing continuous reception while waiting for a DL retransmission after one HARQ RTT. The minimum active time is equal to the length of an on-duration, and the maximum active time is undefined (infinite).

FIG. 1 illustrates DRX ON and DRX OFF periods during a DRX cycle. DRX ON and DRX OFF durations may also be referred to as DRX ON and DRX OFF durations. FIG. 2 illustrates a DRX cycle operation in LTE with more detailed parameters.

Herein, DRX configuration may also be an enhanced or extended DRX (eDRX) configuration. In legacy DRX related procedures, the UE may be configured with DRX cycle length of up to 2.56 seconds. However, UEs supporting extended DRX (eDRX) may be configured with a DRX cycle longer than 2.56 seconds and are typically much longer than 2.56 seconds. UEs supporting eDRX may be configured with a DRX cycle on the order of several seconds to several minutes. The eDRX configuration parameters include an eDRX cycle length, a paging window length, and other suitable parameters. The paging window length may also be referred to as a paging time window (PTW) length. Within a PTW of the eDRX, the UE is further configured with one or more legacy DRX cycles.

The next generation random access technology (RAT) includes NR, which may also be referred to as 5G system, and is based on orthogonal frequency division multiplexing (OFDM). The NR supports multiple numerologies for operation between the UE and the base station such as, for example, the transmission and/or reception of signals. In NR, the base station is called a gNodeB (gNB). The term numerology may characterize any one or more of: frame duration, subframe or TTI duration, slot duration, mini-slot duration, symbol durations, subcarrier spacing, number of subcarriers per physical channel such as Resource Block (RB), number of RBs within the bandwidth. A scaling approach, which may be based on a scaling factor such as $2^N$, N=1, 2, or another suitable scaling factor, is considered for deriving subcarrier spacings (SCSs) for NR. The SCS may include 15 kHz, 30 kHz, 60 kHz, 120 KHz, 240 KHz, and other suitable SCSs. The numerology-specific time resource durations such as, for example, slot and subframe, may then be determined in milliseconds based on the SCS. For example, a SCS of $(2^N*15)$ kHz gives exactly $\frac{1}{2^N}$ ms. The SCS used for transmitting synchronization signal (SS) block (SSB) can be different than the SCS used for transmitting signals other than SSB. The UE performs radio measurements over signals transmitted in the SSB. For example, the UE may perform measurements over the primary synchronization signal (PSS) and secondary synchronization signal (SSS). The embodiments are applicable also to power saving operation in NR.

In current MTC and NarrowBand Internet of Things (NB-IOT) design, the UE wakes up in every DRX On-duration to monitor paging in the RRC IDLE state and DL control channel in RRC CONNECTED mode. This behavior comes from the legacy LTE design and can consume a great amount of UE power. Further, the MTC/NB-IOT type of devices are different from legacy LTE devices. One big difference is that MTC/NB-IOT type of devices are mainly developed for sensor type of applications. For example, they sleep most of the time and may only transmit/receive small amount of data unlike legacy LTE UEs. As a result, MTC/NB-IOT type of devices are expected to have very long battery life. Thus, the legacy UE behavior of monitoring paging in every DRX On-duration is inefficient and not suitable for the MTC/NB-IOT type of applications.

SUMMARY

Systems and methods for adaptively monitoring downlink (DL) control channel in discontinuous reception (DRX) are disclosed herein to address the foregoing problems with existing solutions.

According to a first aspect, a method performed by a network node of a wireless communication network is provided. The method comprises obtaining information indicating a capability of a UE of applying a wake-up-signal (WUS). Applying the WUS implies that reception or non-reception of the WUS at the start of an on-duration of a DRX period indicates to the UE to respectively monitor or refrain from monitoring a downlink control channel during the on-duration. The method also comprises obtaining configuration data related to the UE, the configuration data comprising at least one of: a DRX cycle configuration; a type of service or application for which the UE is being used; and a UE coverage level. The method further comprises determining whether the UE is to apply the WUS based on the obtained configuration data.

According to a second aspect, a method performed by a UE operating in a wireless communication network is provided. The UE is capable of applying a WUS, wherein applying the WUS implies that reception or non-reception of the WUS at the start of an on-duration of a DRX period indicates to the UE to respectively monitor or refrain from monitoring a downlink control channel during the on-duration. The method comprises obtaining configuration data related to the UE, the configuration data comprising at least one of: a DRX cycle configuration; a type of service or application for which the UE is being used; and a UE coverage level, and determining whether to apply the WUS, based on the obtained configuration data.

According to a third aspect a network node of a wireless communication network is provided. The network node is configured to obtain information indicating a capability of a UE of applying a WUS, wherein applying the WUS implies that reception or non-reception of the WUS at the start of an on-duration of a DRX period indicates to the UE to respectively monitor or refrain from monitoring a downlink control channel during the on-duration. The network node is further configured to obtain configuration data related to the UE, the configuration data comprising at least one of: a DRX cycle configuration; a type of service or application for which the UE is being used; and a UE coverage level, and to determine whether the UE is to apply the WUS based on the obtained configuration data.

According to a fourth aspect, a UE configured to operate in a wireless communication network is provided. The UE is capable of applying a WUS, wherein applying the WUS implies that reception or non-reception of a WUS at the start of an on-duration of a DRX period indicates to the UE to respectively monitor or refrain from monitoring a downlink control channel during the on-duration. The UE is configured to obtain configuration data related to the UE, the configuration data comprising at least one of: a DRX cycle configuration; a type of service or application for which the UE is being used; and a UE coverage level, and determine whether to apply the WUS based on the obtained configuration data.

According to further aspects, computer programs and carriers containing the computer programs are provided.

Certain embodiments of the present disclosure may provide one or more technical advantages. For example, certain embodiments may enable reduced signaling overhead by configuring the UE to use power saving signals that suits the UE's activity level, application/service, and/or signal level. By adapting the power saving signal(s) based on the UE's activity, types/service, and/or the signal level, resources in the network node are made available for use in transmitting data, increasing transmission of certain type of channels/signals, or serving other wireless devices. As another example, certain embodiments may help to reduce power consumption in the wireless device. As still another example, certain embodiments may enable a wireless device to monitor the downlink (DL) control channel only when the network node is expected to schedule the wireless device with data. This may reduce wireless device complexity, memory, and processing.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
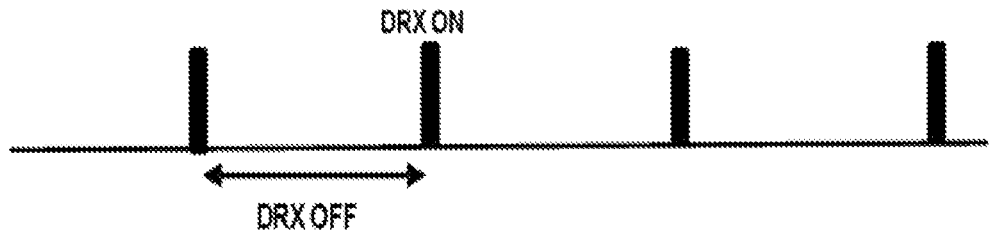
FIG. 1 illustrates discontinuous reception (DRX) ON and DRX OFF periods during a DRX cycle.
Figure 2:
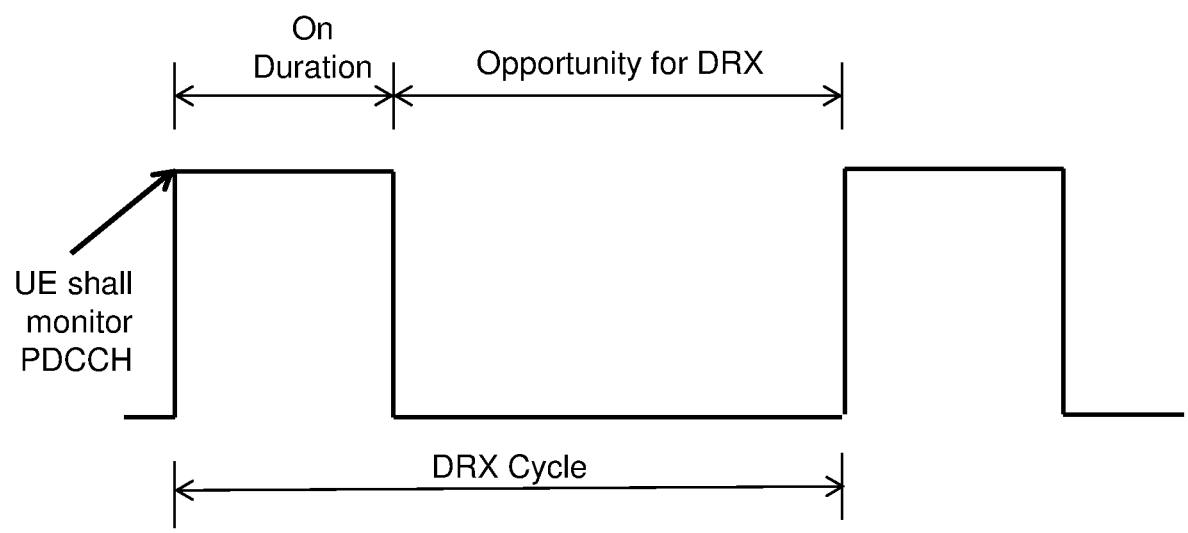
FIG. 2 illustrates a DRX cycle operation in LTE with more detailed parameters

To address the foregoing problems with existing solutions, disclosed is systems and methods for adaptively monitoring downlink (DL) control channel in discontinuous reception (DRX). Particular embodiments are described in FIGS. 1-12 of the drawings, like numerals being used for like and corresponding parts of the various drawings.

The term power saving signal can be any of the following DL control signals: a go-to-sleep (GTS) signal and wake-up-signal (WUS). The GTS and WUS are downlink signals transmitted by the network node. The UE can be configured by the network node to receive one of the two types of signals. GTS or WUS is transmitted during the On-duration of the DRX cycle. If the UE configured with GTS, also receives GTS at the start of On-duration then the UE is not expected to read DL control channel (e.g. PDCCH, NPDCCH, MPDCCH, E-PDCCH etc) during the On-duration. But if the UE does not receive GTS in the On-duration then the UE is required to monitor the DL control channel during the entire On-duration. If the UE configured with WUS, also receives WUS at the start of On-duration then the UE is required to monitor the DL control channel (e.g. PDCCH, NPDCCH, MPDCCH, E-PDCCH etc) during the On-duration. But if the UE does not receive WUS in the beginning of the On-duration then the UE is not required to monitor the DL control channel during the entire On-duration.

According to certain embodiments, a network node uses wireless device configuration data for deciding whether the wireless device should be configured with one of the two types of power saving signals. In a particular embodiment, the network node may further use the wireless device configuration data for selecting one of the two types of power saving signals (wake-up-signal (WUS) and go-to-sleep signal (GTS)). In a particular embodiment, the wireless device configuration data comprises at least one of a UE activity level and a UE signal level. The UE activity level may include a UE bit rate, DRX cycle configuration, and other suitable activity level. The UE signal level may include a UE coverage enhancement level, signal strength, or another signal suitable signal level.

Based on the configuration data, the network node configures the wireless device to apply the selected power saving signal. For example, the network node may configure the wireless device to apply a WUS or a GTS. According to certain embodiments, the wireless device uses the WUS or GTS to determine whether to monitor or not monitor a downlink (DL) control channel during the On-duration of the DRX configuration.

After configuring the wireless device to apply the selected power saving signal, the network node may transmit the selected power saving signal on a periodic or as-needed basis. For example, according to certain embodiments, a GTS may be sent by the network node to the wireless device to indicate that there will be no message (e.g. paging, scheduling, etc.) sent during the (e)DRX cycle that follows. Upon receiving such a signal, the wireless device goes back to the sleep mode. However, if the GTS is not detected, then the wireless device does not go to the sleep mode and attempt to receive a control channel (e.g. Narrowband PDCCH (NPDCCH), MTC PDCCH (MPDCCH), PDCCH).

As another example, a WUS may be sent by the network node to the wireless device to indicate that there will be one or more messages (e.g. paging, scheduling, etc.) sent during the (e)DRX cycle that follows. Upon receiving the WUS, the wireless device shall stay awake to decode a control channel such as NPDDCH, MPDDCH, PDCCH. However, if the WUS is not present, the UE can go back to sleep.

According to certain embodiments, the wireless device may use configuration data and obtained information such as, for example, thresholds related to the configuration data for autonomously deciding whether the wireless device should apply one of the two types of power saving signals. The wireless device may further use the configuration data and the obtained information for selecting one of the two types of power saving signals. In a particular embodiment, the two types of power saving signals may include a wake-up-signal (WUS) and a go-to-sleep signal (GTS) as introduced in 5GPP Release 15. The wireless device further applies the selected power saving signal for monitoring a DL control channel such as, for example, the PDCCH, during the On-duration of the DRX cycle. For example, as stated above, if the wireless device receives a GTS, the wireless device determines whether the GTS signal is intended for the wireless device. If the GTS signal is intended for the wireless device, the wireless device can go to sleep in the On-duration. The wireless device does not have to monitor the DL control channel Conversely, if the wireless device receives a WUS and determines that the WUS signal was intended for the wireless device, the wireless device must monitor the DL control channel in the remaining part of the On-duration. The method, as performed by the wireless device, to determine whether to apply one of the power saving signals or to select between the power saving signals can be realized by specifying one or more pre-defined rules in the standard and/or by the network node configuring the wireless device to apply one or more rules.

In some embodiments a more general term "network node" is used and it can correspond to any type of radio network node or any network node, which communicates with a UE and/or with another network node. Examples of network nodes are NodeB, Master eNodeB, Secondary eNB, a network node belonging to Master Cell Group (MCG) or Secondary Cell Group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit, Remote Radio Head, nodes in distributed antenna system (DAS), core network node (e.g. Mobile Switching Center (MSC), Mobility Management Entity (MME)), Operation and Maintenance (O&M) node, Operation and Support System (OSS), Self-Organizing Network (SON) node, positioning node (e.g. E-SMLC), Minimization of Drive Test (MDT) node, and other test equipment (physical node or software).

In some embodiments the non-limiting terms user equipment (UE) or wireless device are used and refers to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminal, smart phone, laptop embedded equipment (LEE), laptop mounted equipment (LME), USB dongles, ProSe UE.

The term "radio measurement" (a.k.a. measurements) used herein may refer to any measurement performed on radio signals. Examples of radio signals are discovery reference signals (DRS), such as Positioning Reference Signals (PRS), Cell Specific Reference Signals (CRS). In another example, DRS can be any periodic signal with a configurable or pre-defined periodicity or signals based on a time-domain pattern. In another more narrow and specific example, DRS signals are as specified in 3GPP 36.211. Radio measurements can be absolute or relative. Radio measurements can be e.g. intra-frequency, or inter-frequency. Radio measurements can be unidirectional (e.g., DL or UL) or bidirectional (e.g., Round Trip Time (RTT) measurement). Some examples of radio measurements are: timing measurements, angle measurements (e.g., angle of arrival), power-based measurements (e.g., received signal power, RSRP, received signal quality, RSRQ), cell detection or cell identification, beam detection or beam identification, Radio Link measurement (RLM), and system information reading.

Performing a measurement on a carrier may imply performing measurements on signals of one or more cells operating on that carrier or performing measurements on signals of the carrier (aka carrier specific measurement). Examples of cell specific measurements are signal strength, signal quality etc.

The coverage level of the wireless device may be defined with respect to any cell e.g. serving cell, non-serving cell, neighbor cell. The coverage level may also be referred to as the coverage enhancement (CE) level. For example, the CE level with respect to a cell can be expressed in terms of signal level received at the wireless device from that cell. Alternatively, the CE level of the wireless device with respect to a cell can be expressed in terms of signal level received at the cell from the wireless device. As an example, received signal level can be expressed in terms of received signal quality and/or received signal strength at the wireless device with respect to the cell. More specifically the coverage level may be expressed in terms of:

received signal quality and/or received signal strength at the UE with regard to a cell and/or received signal quality and/or received signal strength at the cell with regard to the UE.

Examples of signal quality are Signal-to-Noise Ratio (SNR), Signal to Interference and Noise Ratio (SINR), Channel Quality Indicator (CQI), Reference Signal Received Quality (RSRQ), NRSRQ, Cell-Specific Reference Signal (CRS) Ês/Iot, synchronization signals (SCH) Ês/Iot etc. Examples of signal strength are path loss, path gain, reference signal received power (RSRP), NRSRP, synchronization signals (SCH)_RP, etc. The notation Ês/Iot is defined as ratio of Ês, which is the received energy per RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector The CE level is also expressed in terms of two or more discrete levels or values e.g. CE level 1, CE level 2, CE level 3. Consider an example of two coverage levels defined with respect to signal quality such as, for example, SNR at the wireless device comprising of:

Coverage enhancement level 1 (CE1) comprising of SNR≥−6 dB at UE with regard to a cell; and Coverage enhancement level 2 (CE2) comprising of −15 dB≥SNR<−6 dB at UE with regard to a cell.

In the above example, the CE1 may also be interchangeably called a normal coverage level, baseline coverage level, reference coverage level, legacy coverage level, or other suitable name. On the other hand, CE2 may be referred to as an enhanced coverage or extended coverage level. A cell with an enhanced or extended coverage level is considered to have better or higher coverage level compared to a cell with normal or baseline CE level. In the above example, a cell with CE2 is considered to have better or higher coverage level compared to a cell with CE1.

In another example, two different coverage levels (e.g. normal coverage and enhanced coverage) may be defined in terms of signal quality levels as follows:

The requirements for normal coverage or CEModeA are applicable for the UE category M1 with regard to a cell provided that radio conditions of the UE with respect to that cell are defined as follows SCH Ês/Iot≥−6 dB and CRS Ês/Iot≥−6.

The requirements for enhanced coverage or CEModeB are applicable for the UE category M1 with regard to a cell provided that radio conditions of the UE with respect to that cell are defined as follows SCH Ês/Iot≥−15 dB and CRS Ês/Iot≥−15.

The embodiments described herein may apply to any RRC state, e.g., RRC_CONNECTED or RRC_IDLE.

Figure 3:
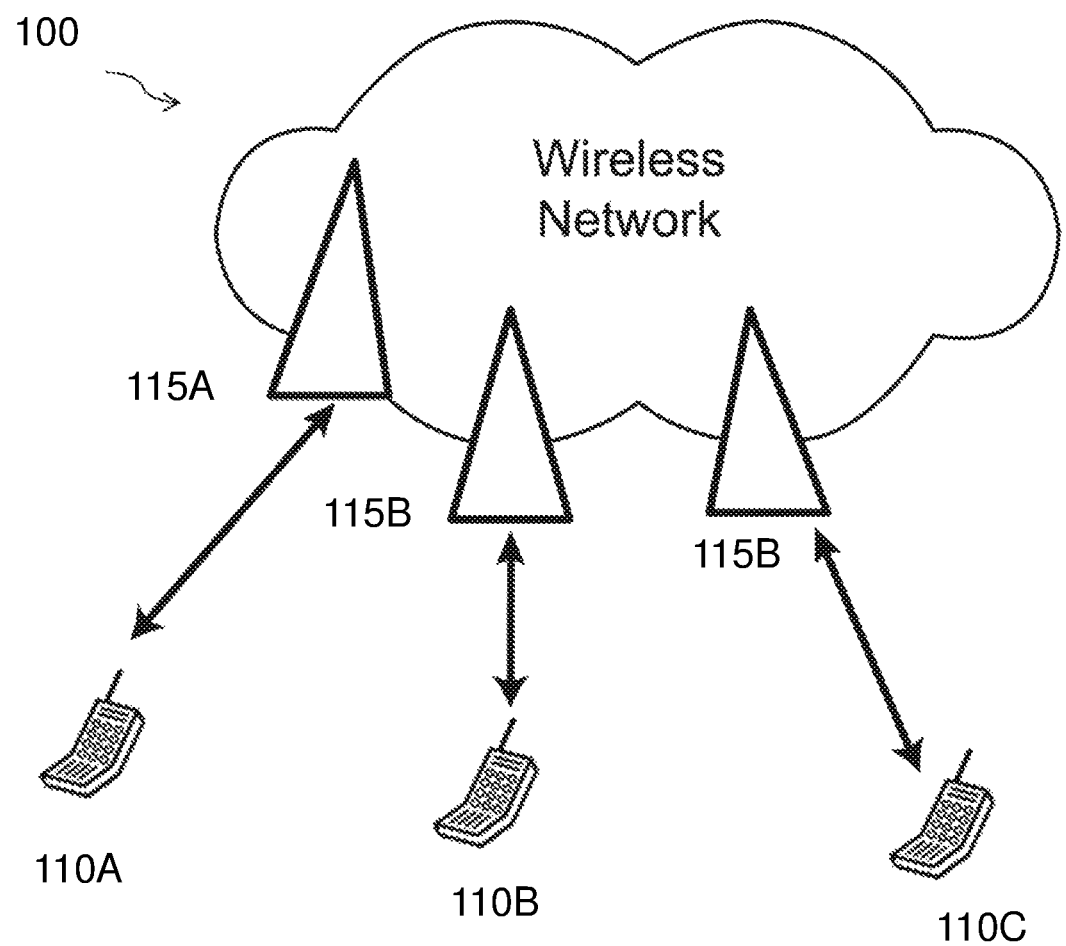
FIG. 3 illustrates an example wireless network for adaptively monitoring downlink control (DL) channel in DRX, according to certain embodiments.

FIG. 3 illustrates a wireless network 100 for adaptively monitoring a DL control channel in DRX, in accordance with certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 3). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. A wireless device 110 may also be referred to as UE, a station (STA), a device, or a terminal in some embodiments. Also, in some embodiments, generic terminology, "network node", is used. Example embodiments of network nodes 115, and wireless devices 110, are described in more detail with respect to FIGS. 4, and 8, respectively.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any LTE based systems such as MTC, eMTC, and NB-IoT. As an example, MTC UE, eMTC UE, and NB-IoT UE may also be called UE category 0, UE category M1 and UE category NB1, respectively. However, the embodiments are applicable to any radio access technology (RAT) or multi-RAT systems in which the wireless device receives and/or transmits signals (e.g., data). For example, the various embodiments described herein may also be applicable to, LTE-Advanced, and LTE-U UMTS, LTE FDD/TDD, WCDMA/HSPA, GSM/GERAN, WiFi, WLAN, cdma2000, WiMax, 5G, New Radio (NR), another suitable radio access technology, or any suitable combination of one or more radio access technologies. It is noted that 5G, the fifth generation of mobile telecommunications and wireless technology includes work on 5G New Radio (NR) Access Technology in 3GPP. LTE terminology is used herein in a forward-looking sense, to include equivalent 5G entities or functionalities although a different term may be specified in 5G.

Figure 4:
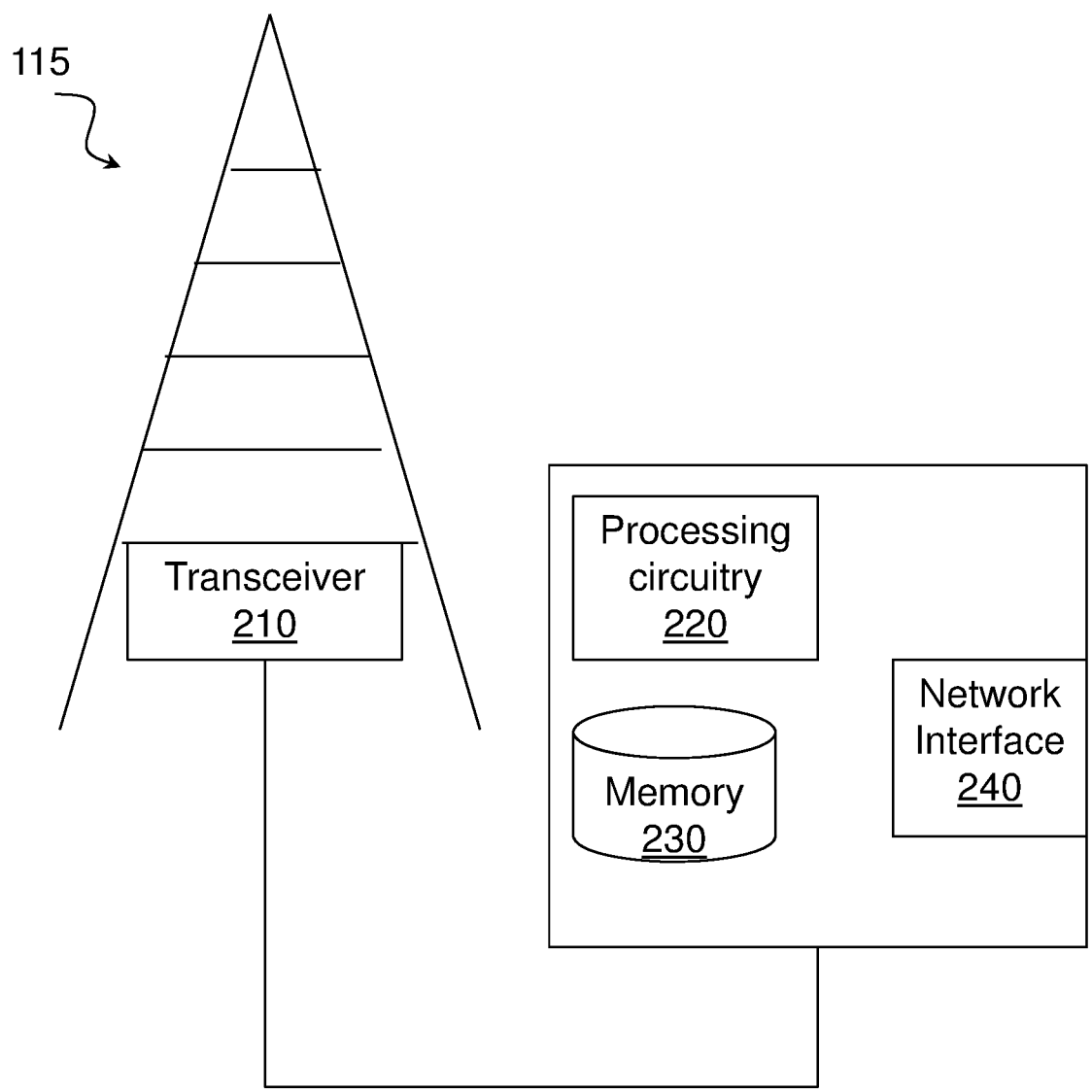
FIG. 4 illustrate an example network node for adaptively monitoring DL control channel in DRX, according to certain embodiments.

FIG. 4 illustrate an example network node 115 for adaptively monitoring a DL control channel in DRX, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processing circuitry 220, memory 230, and network interface 240. In some embodiments, transceiver 210 facilitates transmitting wireless signals to and receiving wireless signals from wireless device 110 (e.g., via an antenna), processing circuitry 220 executes instructions to provide some or all of the functionality described above as being provided by a network node 115, memory 230 stores the instructions executed by processing circuitry 220, and network interface 240 communicates signals to backend network components, such as a gateway, switch, router, Internet, Public Switched Telephone Network (PSTN), core network nodes or radio network controllers.

In certain embodiments, network node 115 may be capable of using multi-antenna techniques and may be equipped with multiple antennas and capable of supporting Multiple Input Multiple output (MIMO) techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 220 may include any suitable combination of hardware and software implemented in one or more modules to execute instructions and manipulate data to perform some or all of the described functions of network node 115. In some embodiments, processing circuitry 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processing circuitry 220 and may refer to any suitable device operable to receive input for network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

In embodiment, the network node 115 of a wireless communication network, is configured to obtain information indicating a capability of a UE 110 of applying a WUS, wherein applying the WUS implies that reception or non-reception of the WUS at the start of an on-duration of a DRX period indicates to the UE to respectively monitor or refrain from monitoring a downlink control channel during the on-duration. The network node is further configured to obtain configuration data related to the UE, the configuration data comprising at least one of: a DRX cycle configuration; a type of service or application for which the UE is being used; and a UE coverage level. The network node is also configured to determine whether the UE is to apply the WUS based on the obtained configuration data. The network node may be further configured to determine whether the UE is to apply the WUS based on one or more pre-defined rules. The network node may be further configured to, in response to determining that the UE is to apply the WUS, configure the UE to apply the WUS. The network node may be further configured to transmit a WUS to the UE. The network node may be configured to obtain information indicating the capability of the UE by determining the capability of the UE based on at least one of: an operational coverage mode of the UE; information indicating at least one of a UE category and a UE capability. The network node may be configured to receive, from the UE, the information indicating at least one of a UE category and a UE capability. The network node may be configured to obtain the configuration data related to the UE by receiving the data from another network node. The network node may be configured to determine whether the UE is to apply the WUS by one of the followings: determining that the UE is to apply the WUS when a DRX cycle length determined from the DRX cycle configuration exceeds a first threshold; determining that the UE is to apply the WUS when an activity level associated with the type of service or application for which the UE is being used is below a second threshold; determining that the UE is to apply the WUS when the UE coverage level indicates that the UE operates in an enhanced coverage mode.

Figure 5A:
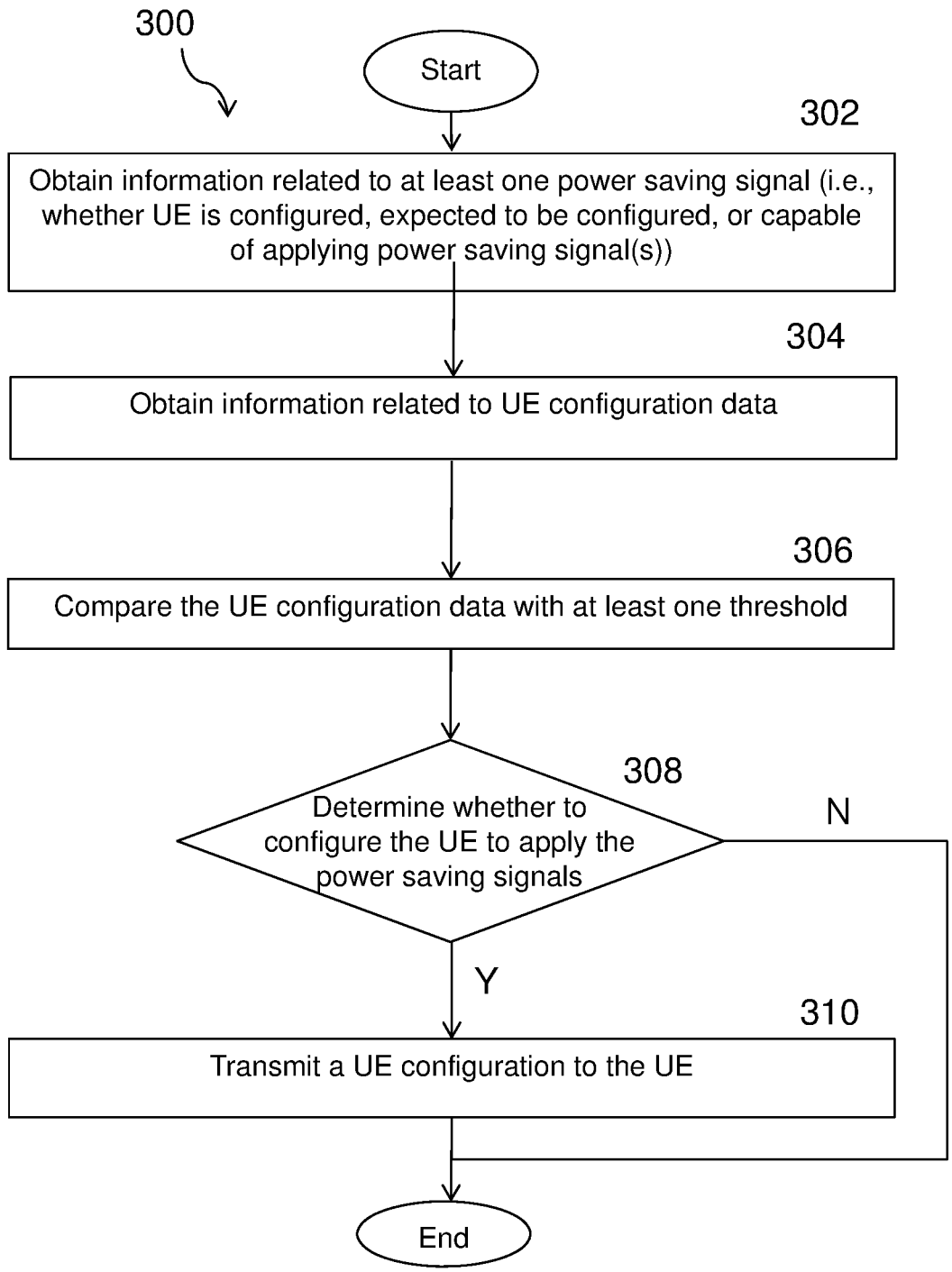
FIG. 5a illustrates an example method by a network node for adaptively monitoring DL control channel in DRX, according to certain embodiments.

FIG. 5a illustrates an example method 300 by a network node 115 for adaptively monitoring a DL control channel in DRX, according to certain example embodiments. The method begins at step 302 when network node 115 obtains information related to at least one power saving signal. In a particular embodiment, the at least one power saving signal may include a WUS or a GTS.

In a particular embodiment, the information related to the at least one power saving signal identifies or may be used to determine whether the UE is configured to receive and/or apply at least one power saving signal or expected to be configured to receive and/or apply at least one type of power saving signal. Additionally, or alternatively, the information may be used to determine whether the UE is capable of receiving and/or applying a power saving signal.

In an example embodiment, application of power saving signals can be a UE capability. In yet another example, a certain type (MTC) of UEs (e.g. certain type of UE categories Cat-M1, NB1 etc.) are required to support the use of power saving signals while legacy UEs are not required to support this feature. Thus, in this case, the network node 115 may determine whether a UE is capable of power saving signals based on the UE category information. The UE signals information about its supported UE category to the network node.

According to certain embodiments, the UE may indicate its capability to support the power saving signals by signaling UE capability information to the network node. The UE may signal the information using RRC signaling in connected state and/or in idle state. For example, UE may indicate to the network node 115 that the UE is capable of applying the power saving signal which can be a WUS or a GTS or both. The term applying the power saving signal herein means that the UE is capable of receiving, processing, decoding, interpreting and taking an action based on the received power saving signal. For example, if the UE is capable of applying power saving signal and configured with WUS, the UE upon receiving WUS may be required to monitor a DL control channel during the On-duration of the DRX cycle. Conversely, if the UE is configured with WUS but does not receive any WUS, the UE is not required to monitor a DL control channel during the On-duration of the DRX cycle.

According to certain embodiments, use of power saving signals might be required in certain operation mode such as under certain coverage enhancement level such as, for example, in extreme coverage. Network node 115 may use this information to decide whether the UE is configured, expected to be configured or capable of using the power saving signals.

According to certain embodiments, the information may be obtained in any one of following ways:
  Based on UE category; e.g. the MTC type of UEs (categories 0, M1, M2, NB1, NB2) are likely to be
  Based on the operational mode (e.g. normal coverage, enhanced coverage)
  Based on dedicated signaling or indication transmitted by the UE or other nodes in the network (e.g. third-party node/server etc.).
  Based on the UE capability information, network node 115 may identify whether the UE is capable of supporting the use of power saving signals.

At step 304, network node 115 obtains information related to UE configuration data. According to certain embodiments, the UE configuration data may include at least one of a UE activity level and a UE signal level. In a particular embodiment, the UE activity level may be determined based on at least one of a DRX cycle configuration or a type of service or application. The DRX cycle configuration may be a configuration comprising of one or more DRX cycles and/or one or more eDRX cycles.

In a particular embodiment, the UE signal level may be determined based on at least one of a UE coverage level, a signal level estimated at the UE, and/or a UE transmitted signal estimated by the network node.

The above mentioned various attributes of the UE configuration data are further explained below:
  UE activity level
    DRX cycle configuration:
      The DRX related information obtained by the network node is described in section 2.1.1. The used DRX related information for a particular UE is known to the network since it is actually configured by the network node. However, the serving network node may also obtain this information from a third-party node (which may be the case for IoT type of devices) or any other network devices. From this information, network knows how frequent a UE is going to be awake, for how long it is going to be awake, and its active time.
    Since IoT type of devices are not typically expected to be receiving or transmitting a lot frequent data, the UE may be configured with DRX configurations that allows the UE to sleep for long time and save battery life. However, there might be different types of IoT devices which require different types of DRX configurations. For example, one device is deployed in an office environment might be configured be awake quite frequently while another device which is deployed in a farming field might be configured to be only awake once a day. The former UE might be configured with normal DRX with a DRX length of 2.56 seconds while the latter UE might be configured with eDRX with a DRX length of 40+ minutes.

Similar to the DRX cycle lengths, also the activity time may also differ depending on the device type.

Type of service or application

The obtained information may also reveal information on the:

Device type in terms of its mobility state; e.g. whether it is a stationary device, or mobile device, so semi-mobile device etc. This in turn may indicate the type of service used by the UE. For example, a stationary device, which can be a sensor, may transmit and/or receive data very infrequently e.g. once every 15-30 minutes. In this case the UE activity level may be considered low. But if the device exhibits some level of mobility (i.e. it moves frequently or occasionally) then its activity level is considered to be moderate or high. The mobility state of the UE can be determined by the network node based on one or more of the following mechanisms: rate of cell changes (e.g. number handovers per unit time), Doppler speed of the UE estimated by the UE and/or by the network node etc.

Specific type of service or application for which the device is being used; e.g. for temperature monitoring, in houses for alarm monitoring, in buildings for detecting activity, in farming fields etc. This type of information can be obtained from:
a network node storing information about the application or service used by the UE e.g. by core network, by a radio network node etc.
third party node
application server
subscription information or operator data
SIM card
Historical data or statistics
Estimation of traffic activity e.g. average UE bit rate, relation between average UE bit rate and peak UE bit rate etc.

The mobility of the device may also depend on the type of service/application it is used for offering. For example, IoT devices deployed in a field might be stationary while the IoT devices deployed in a vehicles might be mobile.

UE signal level may also comprise at least one of:

1) UE coverage level: The coverage level (aka coverage enhancement level) of the UE with regard to a cell might be known to the network node. For example, for category M1/M2 UEs, the network node can configure the UE to operate in a certain coverage mode known as CEModeA and CEModeB while in CONNECTED state. Similarly, the network node can determine the coverage mode of the UE in IDLE state based on reported measurement result, PRACH CE level selection. For example, the network node determines the UE coverage enhancement level with regards to a cell (e.g. serving cell) during random access (RA) procedure based on the number of repetitions with which the UE sends the RA channel to the network node. The UE selects the number of repetitions of RA based on the signal strength (e.g. path loss, RSRP, NRSRP etc) of the UE estimated by the UE. In some examples, the UE may indicate to the network node its coverage level. In some other examples, the network node may obtain this information from other nodes in the network (e.g. core network, third party node, etc.).

2) UE received signal level at the UE: The UE may report to the network node the results of the downlink measurement it has performed. Examples of such measurements are e.g., received signal power, RSRP, received signal quality, RSRQ, SINR, SNR, interference power, total interference plus noise, RSSI, noise power, CQI, CSI, PMI, etc. The reporting can be periodic, event-triggered or periodic event-triggered. Other examples of downlink measurements are described in section 5.1. These results are used by the network node to determine the CE level of the UE with regard to a cell. For example, when RSRP is below certain threshold then the network node assumes that the UE is operating in enhanced coverage with regard to the cell; otherwise the network node assumes that the UE is operating in normal coverage with regard to that cell.

3) UE transmitted signal received at the network node: Similarly, the network node may also perform measurement on the signals transmitted by the UE. These measurements are based on the uplink signals transmitted by the UE, and examples of such signals are SRS, DMRS etc. These results are used by the network node to determine the CE level of the UE with regard to a cell. For example, when signal strength measured on SRS transmitted by the UE is below certain threshold then the network node assumes that the UE is operating in enhanced coverage with regard to the cell; otherwise the network node assumes that the UE is operating in normal coverage with regard to that cell.

At step 306, network node 115 compares the obtained information to determine whether to apply the power saving signals, at step 308. According to certain embodiments, network node 115 may further determine which of the two power saving signals is to be applied by the UE, at step 308.

Firstly, it will be described how the network node uses the obtained information on DRX cycle configuration to determine whether to use the power saving signals. As described previously, there are two types of power saving signals, referred to as GTS and WUS. Generally, it is good to reduce the signaling as much as possible in a network since it increases the overhead for the network and consumes the resources which can be used for scheduling UEs. The main objective is to select one of the power saving signals that fits DRX cycle configuration used for this particular UE.

For a UE which is configured to wake up frequently, it is more beneficial to configure that UE with GTS since it can reduce signaling compared to WUS and GTS will be transmitted only when the UE is to sleep. On the other hand, when the UE is configured to sleep most of the time (e.g. with long eDRX cycle), it is more beneficial to configure that UE with WUS since it can also reduce the signaling overhead for that UE and WUS will only be transmitted to wake up that UE.

According to certain embodiments, the use power saving signal can be enabled based on the used DRX configurations. If the UE is configured to wake up frequently then it might be beneficial to not configure the UE with any power saving signal because it may lead to increased signaling overhead while the gain power saving might not be significant. In this case, the network node 115 may only configure the UE to use power saving signal (WUS, GTS or both) when the configured DRX threshold is greater than a first activity threshold known as (Ha1). In particular embodiments, the first activity threshold may be approximately 20 ms, 40 ms, 80 ms, or another suitable activity threshold.

TABLE 1

Use of power saving signals based on DRX cycle length

| DRX cycle lengths | Use of power saving signal |
|---|---|
| DRX cycle < Ha1 | Not applicable |
| DRX cycle length ≥ Ha1 | Apply power saving signal |

According to another embodiment, the type of power saving signal (GTS or WUS) to use may also depend on the used DRX configurations. In order to decide exactly when to use which signal, i.e. when to go from using WUS to GTS and vice versa, the DRX configuration is compared with a certain threshold. This threshold can be referred to as a second activity threshold (Ha2) and can define the boundary of the use of two signals. Typically, Ha2>Ha1. Examples of Ha2 are 640 ms, 1280 ms etc. Ha2 can refer to the boundary in DRX cycle lengths, and a rule can be defined. For example, network node 115 may compare the DRX cycle length with Ha2 in order to decide whether network node 115 shall configure the UE to use GTS or WUS. This is elaborated with an example in Table 2, where the network node 115 decides to configure the UE with GTS for power saving when the DRX cycle<Ha2. Otherwise, network node 115 may decide to configure the UE with WUS. The rationale behind this example embodiment is that the UE under shorter DRX cycle is expected to be served more frequently. In this case, the UE will typically monitor the DL control channel (e.g. PDCCH, NPDCCH, E-PDCCH, MPDCCH etc) more frequently during the On-duration of the DRX cycle. Therefore under shorter DRX cycle (i.e. DRX cycle<Ha2) or under higher activity level the UE is configured with GTS whereas otherwise, (i.e. under longer DRX cycle e.g. DRX cycle≥Ha2) or lower higher activity level the UE is configured with WUS.

TABLE 2

Example of using type of power saving
signals based on DRX cycle length

| DRX cycle lengths | Type of power saving signal to use |
|---|---|
| DRX cycle < Ha2 | GTS |
| DRX cycle length ≥ Ha2 | WUS |

In the above examples, the use of power saving signals were exemplified only using threshold for DRX cycle lengths. However, the same principle (using a threshold) can be applied with other DRX related parameters such as activity length, DRX On-duration, PTW length, in-activity-timer.

Secondly, the network node may use the information obtained with regard to type of service/application to decide whether to use or which type of power saving signals to apply. Here, the whether to apply the power saving signals, and what type of power saving signals can be based on the service or application. For example, if the obtained information indicate that the UE is stationary and used service/application indicate that it is not transmitting/receiving data frequently, then this UE is good candidate for being configured with power saving signals. Similarly, if the obtained information indicate that this UE is moving quite a lot and transmitting and/or receiving data on frequently, then there may not be significant gain in power consumption. This UE may not be a very suitable candidate for using power saving signals. In the example in table 3, the UE activity level of service type 1 is above certain activity threshold (i.e. higher activity level) whereas the UE activity level of service type 2 is less than or equal to the activity threshold. As described earlier that the UE activity level can be determined based on UE average and/or maximum bit rate etc.

TABLE 3

Use of power saving signal based on type of service/application

| Type of service/application | Use of power saving signal |
|---|---|
| Service type 1 | Not apply |
| Service type 2 | Apply |
| ... | ... |

Similarly, the network node may also decide to use a certain type of power saving signal based on the type of service/application as shown below in the example in table 4. In this example in table 4, the UE activity level of service type 3 is lower than the UE activity level of service type 2, while the UE activity level of service type 2 is lower than the UE activity level of service type 1.

TABLE 4

Another example of service/application-
based use of power saving signal

| Type of service/application | Type of power saving signal to use |
|---|---|
| Service type 1 | GTS |
| Service type 2 | WUS |
| Service type 3 | WUS |
| ... | ... |

Moreover, the network node may also group the UEs into groups based on service or application they provide. Then each group of the UEs can be configured to use a certain type of power saving signal or may not be configured to use any type of power saving signal at all.

TABLE 5

Group of UEs configured to use particular
type of power saving signal

| UE Group | Type of power saving signal to use |
|---|---|
| Group 1 | GTS |
| Group 2 | WUS |
| Group 3 | Don't use any |
| ... | ... |

According to certain other embodiments, network node 115 may determine to use the power saving signal and type of power saving signal based on the obtained information about the UE signal level. As described in previous step, the UE signal level comprises at least one of: UE coverage level, UE received signal level at the UE, UE transmitted signal received at the network node. Below we exemplify how they are used.

In a particular embodiment, for example, network node 115 may configure the UE to use power saving signals only when the UE operates in extended coverage (e.g. CEModeB) or when the CE level is above a threshold e.g. when CE level is equal to or above CE2. But in normal coverage or when UE coverage enhancement level is below threshold (e.g. CE2) then the UE is not configured with any power saving signal. This is demonstrated in the example in table 6 below. Typically, sensor type of devices is deployed to operate in extended coverage and they are expected to infrequently transmit/receive small amount of data. For such UEs, it is beneficial to configure with WUS since they will be sleeping most of the time. The normal coverage UEs (e.g. CEModeA) can be more like legacy UEs, and mobile, and for such UEs there may not be big gains in power saving. For this type of UEs, it might be beneficial to configure with GTSs as shown in table 7. In another example embodiment, as in Table 6, they can also be configured not to use any type of power saving signal at all.

TABLE 6

An example of configuring power saving signal based on UE coverage mode

| Coverage mode | Type of power saving signal to use |
| --- | --- |
| Normal coverage/CEModeA | Don't use any |
| Enhanced coverage/CEModeB | WUS |
| . . . | . . . |

TABLE 7

Another example of configuring power saving signal based on UE coverage mode

| Coverage mode | Type of power saving signal to use |
| --- | --- |
| Normal coverage/CEModeA | GTS |
| Enhanced coverage/CEModeB | WUS |
| . . . | . . . |

Likewise, whether to use power saving signal and the type of power saving signal can be based on obtained information on measurement data such as downlink signal level and/or uplink signal level which are obtained in previous step. For example, the downlink measurement result (e.g. signal level Ês/IoT, SNR, SINR, RSRQ, NRSRQ etc) may indicate the coverage level of the UE. This can be used to decide the coverage mode of the UE, and also the type of power saving signals. When the UE signal level is in a certain range, it can be beneficial to use a certain type of power saving signal or to not use any power saving signal at all since there might be more signal overhead than the power-consumption gain. Determination can also be based on uplink signal measurement transmitted by the UE and measured/received by the network node. One example of downlink signal level-based use of power saving signal is given below in Table 8. It shall be noted that similar usage can be adopted based on uplink signal level as well.

TABLE 8

Another example of coverage mode based use of power saving signal

| Es/Iot (dB) | Type of power saving signal to use |
| --- | --- |
| Es/Iot ≥ −6 | Don't use any |
| −6 ≤ Es/Iot ≤ −12 | GTS |

TABLE 8-continued

Another example of coverage mode based use of power saving signal

| Es/Iot (dB) | Type of power saving signal to use |
| --- | --- |
| Es/Iot < −12 | WUS |
| . . . | . . . |

The network node 115 selects the power saving signal according to the comparison between the UE configuration data and their respective thresholds as described in the above examples. At step 310, network node 115 transmits a configuration (e.g. a parameter, a threshold) to the UE if it is determined to configure the UE to apply the power saving signal. In this step, the network node 115 configures the UE with one of the power saving signals, which the UE shall applies when operating in DRX.

According to certain embodiments, network node 115 creates a configuration message which includes information about the power saving signal selected by the network node 115 in step 308. The network node transmits the configuration containing the information about the selected power saving signal to the UE. The UE uses this information to apply the power saving signal for monitoring the DL control channel in the On-duration of the DRX cycle. The configuration information includes at least an identifier of one of the selected power saving signals based on UE configuration data as described in the previous step. For example, if the UE is configured to receive GTS then the UE shall apply GTS for saving its power. This means the UE shall monitor the presence of GTS during the start of the On-duration of the DRX cycle. But if the UE is configured to receive WUS then the UE shall apply WUS for saving its power.

Figure 5B:
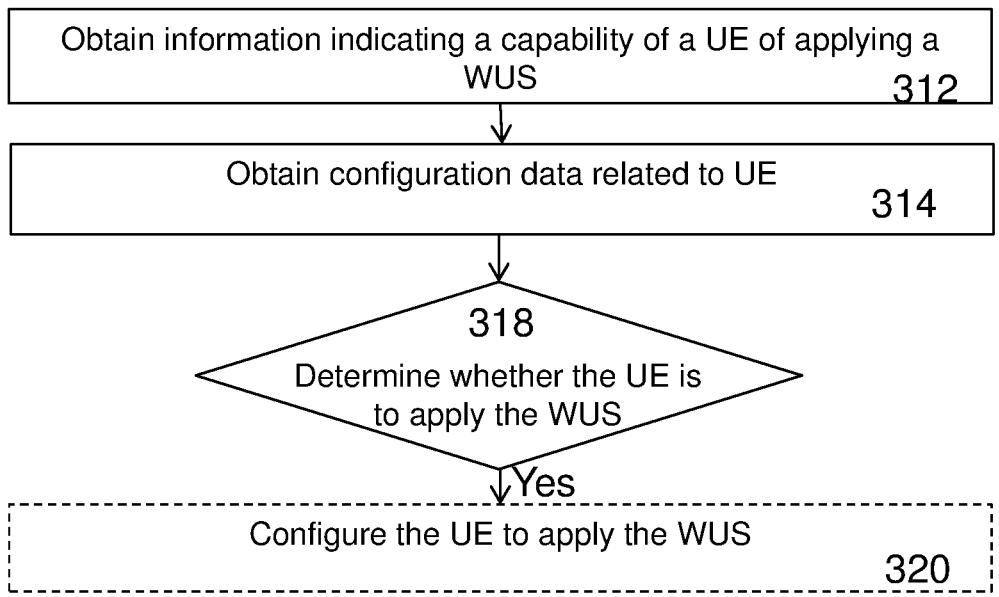
FIG. 5b illustrates an example method by a network node according to certain embodiments.

FIG. 5b is a flowchart illustrating a method performed by a network node 115 of a wireless communication network according to specific embodiments of the invention. The method illustrated addresses the problem of battery waste for UEs that are used for applications where the UE sleeps most of the time and sends/receives a small amount of data compared to legacy UEs. Examples of such UEs are NB-IoT or MTC UEs. The method enables to configure the UE to monitor the DL data channel only when the network node is expected to schedule the UE to receive data. The method comprises:

312: Obtain information indicating a capability of the UE 110 of applying a WUS, wherein applying the WUS implies that reception or non-reception of the WUS at the start of an on-duration of a discontinuous reception, DRX, period indicates to the UE to respectively monitor or refrain from monitoring a downlink control channel during the on-duration. Obtaining information indicating the capability of the UE may comprise determining the capability of the UE based on at least one of: an operational coverage mode of the UE; information indicating at least one of a UE category and a UE capability. The information indicating at least one of a UE category and a UE capability may be received from the UE.

314: Obtain configuration data related to the UE, the configuration data comprising at least one of: a DRX cycle configuration; a type of service or application for which the UE is being used; and a UE coverage level. Obtaining the configuration data related to the UE may comprise receiving the data from another network node.

- 318: Determine whether the UE is to apply the WUS based on the obtained configuration data. Determining whether the UE is to apply the WUS may be done based on one or more pre-defined rules. Furthermore, determining whether the UE is to apply the WUS may comprise one of: a) determining that the UE is to apply the WUS when a DRX cycle length determined from the DRX cycle configuration exceeds a first threshold (see example in Table 1); b) determining that the UE is to apply the WUS when an activity level associated with the type of service or application for which the UE is being used is below a second threshold (see example in Table 3); c) determining that the UE is to apply the WUS when the UE coverage level indicates that the UE operates in an enhanced coverage mode (see example in Table 6).
- 320 (optional): In response to determining that the UE is to apply the WUS, the method may comprise configuring the UE to apply the WUS.

The method may in embodiments further comprise transmitting a WUS to the UE. This is done by the network node when data is scheduled for the UE and will trigger the UE to wake up during the on-duration and monitor the DL control channel.

Figure 6:
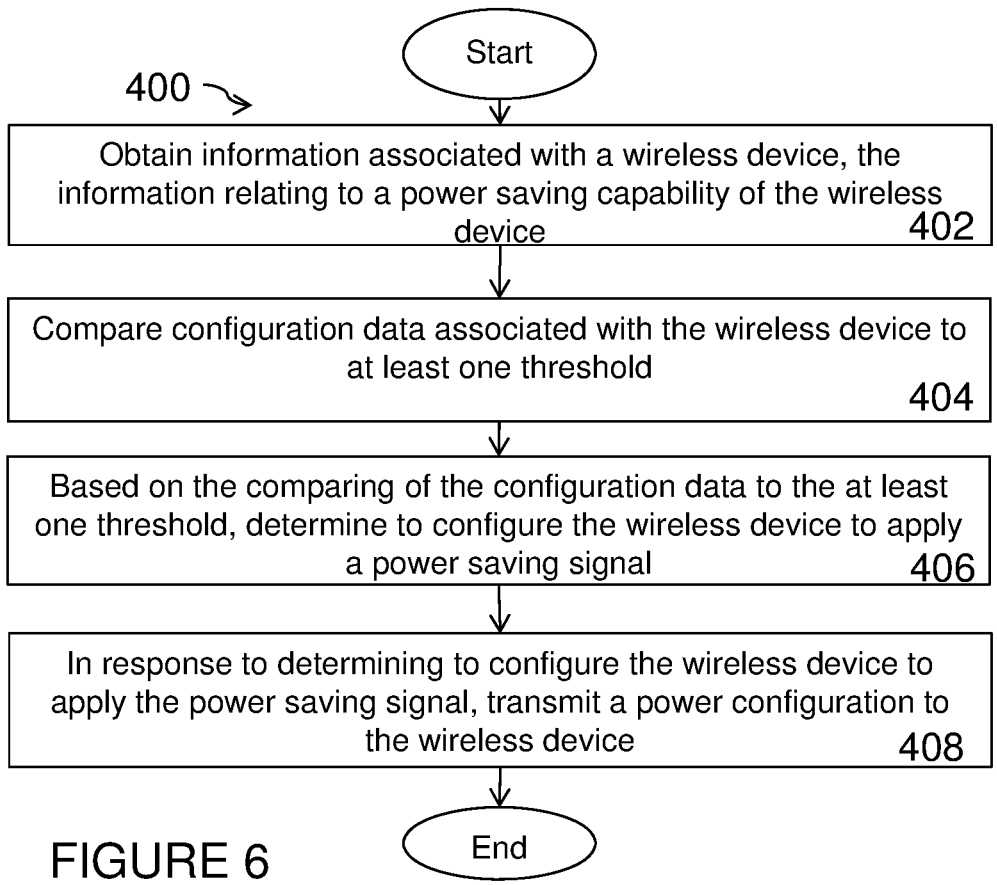
FIG. 6 illustrates another example method by a network node for adaptively monitoring DL control channel in DRX, according to certain embodiments.

FIG. 6 illustrates another example method by a network node 115 for adaptively monitoring DL control channel in DRX, according to certain embodiments. The method may begin at step 402 when network node 115 obtains information, which relates to a power saving capability of the wireless device 110.

In a particular embodiment, network node 115 receives signaling from wireless device 110 that indicates a power saving capability of the wireless device 110. For example, the signaling may be received via RRC signaling. For example, the information may indicate that the wireless device is configured to receive and/or apply a power saving signal or expected to be configured to receive and/or apply a power saving signal. Additionally, or alternatively, the information may indicate that the wireless device is capable of receiving and/or applying a power saving signal. In a particular embodiment, the information indicates or may be used to determine that wireless device 110 is capable of receiving and/or applying a WUS or a GTS.

In another example, embodiment, network node 115 may receive information indicating a type, a category, or an operational mode of the wireless device 110 and determine the power saving capability of the wireless device 110 based on the type of the wireless device, the category, or the operational mode of the device.

At step 404, network node 115 compares configuration data associated with the wireless device to at least one threshold. According to certain embodiments, the configuration data includes an activity level of the wireless device. The activity level may include a type of service or a type of application for which wireless device 110 is used. Network node 115 may compare the activity level of wireless device 110 to an activity threshold.

In a particular embodiment, the activity level comprises a DRX cycle configuration, which may be received from a third-party node. The DRX information may identify a DRX cycle of the wireless device.

According to certain embodiments, the configuration data includes a signal level of wireless device 110. The signal level may include a coverage level of the wireless device 110 or a received signal level of a signal received at the wireless device 110. In a particular embodiment, the signal level is a RSRP measurement taken at the wireless device 110. In another example embodiment, the signal level includes a transmit signal level of a signal transmitted from the wireless device to the network node.

At step 406, network node 115 determines, based on the comparing of the configuration data to the at least one threshold, to configure the wireless device 110 to apply a power saving signal. Additionally, network node 115 may select the at least one power saving signal from a plurality of power saving signals. For example, network node 115 may select a WUS and/or a GTS based on the UE configuration data.

At step 408, network node 115 transmits a power configuration to the wireless device in response to determining to configure the wireless device to apply the power saving signal. According to certain embodiments, the configuration configures wireless device 110 to apply the at least one power saving signal for monitoring a downlink (DL) control channel during an On-duration of a DRX cycle. For example, the power configuration may include a parameter or a threshold associated with power saving. In a particular embodiment, the DL control channel is a physical data control channel (PDCCH).

In a particular embodiment, where the information received at step 402 indicates an ability of wireless device 110 to receive and/or apply a particular one of a WUS or GTS, the configuration transmitted at step 408 may related to the particular one of the WUS or GTS.

Figure 7:
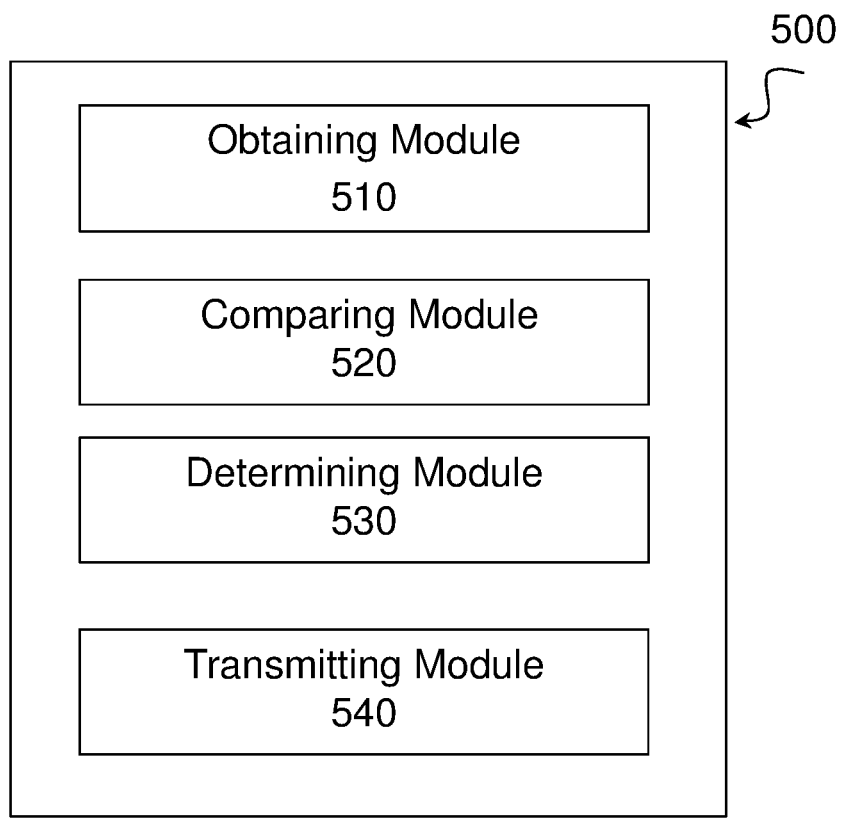
FIG. 7 illustrates an example virtual computing device for adaptively monitoring DL control channel in DRX, according to certain embodiments.

In certain embodiments, the methods for adaptively monitoring DL control channel in DRX as described above may be performed by a virtual computing device. FIG. 7 illustrates an example virtual computing device 500 for adaptively monitoring DL control channel in DRX, according to certain embodiments. In certain embodiments, virtual computing device 500 may include modules for performing some or all of the steps or any combination of similar steps to those described above with regard to the methods illustrated and described in FIGS. 5a-b and 6. For example, virtual computing device 500 may include at least one obtaining module 510, a comparing module 520, a determining module 530, and a transmitting module 540, and any other suitable modules for adaptively monitoring DL control channel in DRX. In some embodiments, one or more of the modules may be implemented using processing circuitry 220 of FIG. 4. In certain embodiments, the functions of two or more of the various modules may be combined into a single module.

The at least one obtaining module 510 may perform some or all of the obtaining functions of virtual computing device 500. For example, in a particular embodiment, obtaining module 510 may obtain information associated with a wireless device 110. The information may relate to a power saving capability of the wireless. As another example, in a particular embodiment, obtaining module 510 or another obtaining module may obtain information related to UE configuration data. As still another example, obtaining module 510 or another obtaining module 510 may obtain information associated with a wireless device, the information relating to a power saving capability of the wireless device.

The comparing module 520 may perform the comparing functions of virtual computing device 500. For example, in a particular embodiment, comparing module 520 may compare the UE configuration data or the configuration data associated with the wireless device to at least one threshold.

The determining module 530 may perform the determining functions of virtual computing device 500. For example, in a particular embodiment, determining module 530 may determine, based on the comparing of the configuration data to the at least one threshold, to configure the wireless device to apply a power saving signal. As another example, in a particular embodiment, determining module 530 may determine whether to configure the UE to apply the power saving signals.

The transmitting module 540 may perform the transmitting functions of virtual computing device 500. For example, in a particular embodiment, transmitting module 540 may transmit a UE configuration to the UE. As another example, in a particular embodiment, transmitting module 540 may transmit a power configuration to the wireless device in response to determining configure the wireless device to apply the power saving signal.

Other embodiments of virtual computing device 500 may include additional components beyond those shown in FIG. 7 that may be responsible for providing certain aspects of the network node's functionality, including any of the functionality described above and/or any additional functionality (including any functionality necessary to support the solutions described above). The various different types of network node 115 may include components having the same physical hardware but configured (e.g., via programming) to support different radio access technologies, or may represent partly or entirely different physical components.

Figure 8:
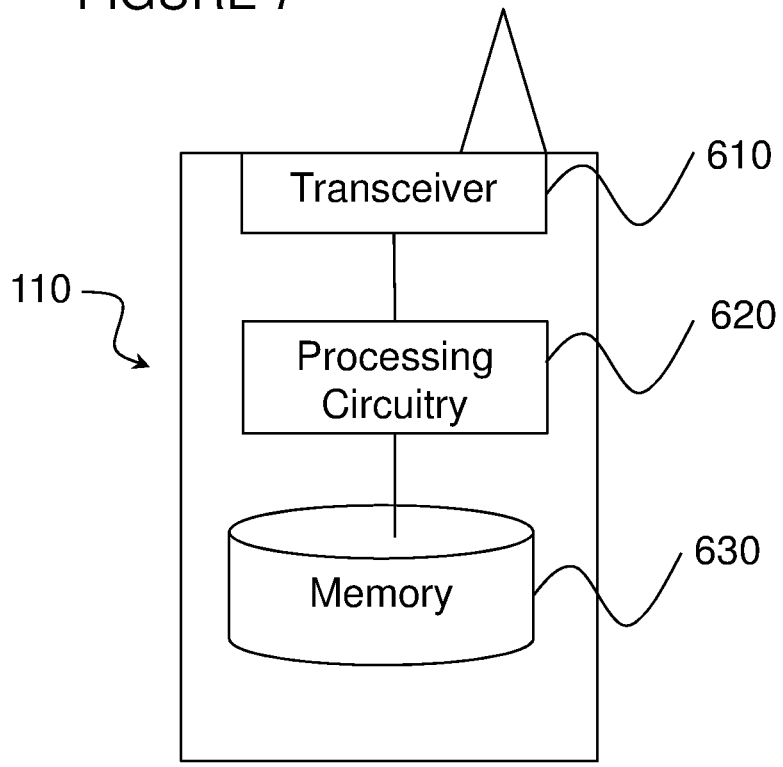
FIG. 8 illustrates an example wireless device for adaptively monitoring DL control channel in DRX, according to certain embodiments.

FIG. 8 illustrates an example wireless device 110 for adaptively monitoring DL control channel in DRX, in accordance with certain embodiments. As depicted, wireless device 110 includes transceiver 610, processing circuitry 620, and memory 630. In some embodiments, transceiver 610 facilitates transmitting wireless signals to and receiving wireless signals from network node 115 (e.g., via an antenna), processing circuitry 620 executes instructions to provide some or all of the functionality described above as being provided by wireless device 110, and memory 630 stores the instructions executed by processing circuitry 620. Examples of a wireless device 110 are provided above.

Processing circuitry 620 may include any suitable combination of hardware and software implemented in one or more modules to execute instructions and manipulate data to perform some or all of the described functions of wireless device 110. In some embodiments, processing circuitry 620 may include, for example, one or more computers, one or more central processing units (CPUs), one or more processors, one or more microprocessors, one or more applications, and/or other logic.

Memory 630 is generally operable to store instructions, such as a computer program, software, an application including one or more of logic, rules, algorithms, code, tables, etc. and/or other instructions capable of being executed by processing circuitry. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

In embodiments, the UE 110 of FIG. 8 is configured to operate in a wireless communication network. The UE is capable of applying a WUS, wherein applying the WUS implies that reception or non-reception of a WUS at the start of an on-duration of a discontinuous reception, DRX, period indicates to the UE to respectively monitor or refrain from monitoring a downlink control channel during the on-duration. The UE is configured to obtain configuration data related to the UE, the configuration data comprising at least one of: a DRX cycle configuration; a type of service or application for which the UE is being used; and a UE coverage level. The UE is further configured to determine whether to apply the WUS based on the obtained configuration data. The UE may be configured to determine whether to apply the WUS based on one or more pre-defined rules. The UE may be configured to determine whether to apply the WUS by determining to apply the WUS when receiving a configuration to apply the WUS from a network node. The UE may be further configured to, when determining to apply the WUS, apply the WUS by monitoring the downlink control channel during the on-duration when having received the WUS at the start of the on-duration and refraining from monitoring the downlink control channel during the on-duration otherwise. The UE may be further configured to transmit information to the network node indicating the capability of the UE of applying the WUS. The information indicating the capability of the UE may comprise information indicating at least one of a UE category and a UE capability. The UE may be configured to obtain the configuration data related to the UE by at least one of: receiving the data from a network node; determining the data based on at least one of statistical data, historical data, or previously used configuration data. The UE may be configured to determine whether to apply the WUS by one of: determining to apply the WUS when a DRX cycle length determined from the DRX cycle configuration exceeds a first threshold; determining to apply the WUS when an activity level associated with the type of service or application for which the UE is being used is below a second threshold; determining to apply the WUS when the UE coverage level indicates that the UE operates in an enhanced coverage mode.

Figure 9:
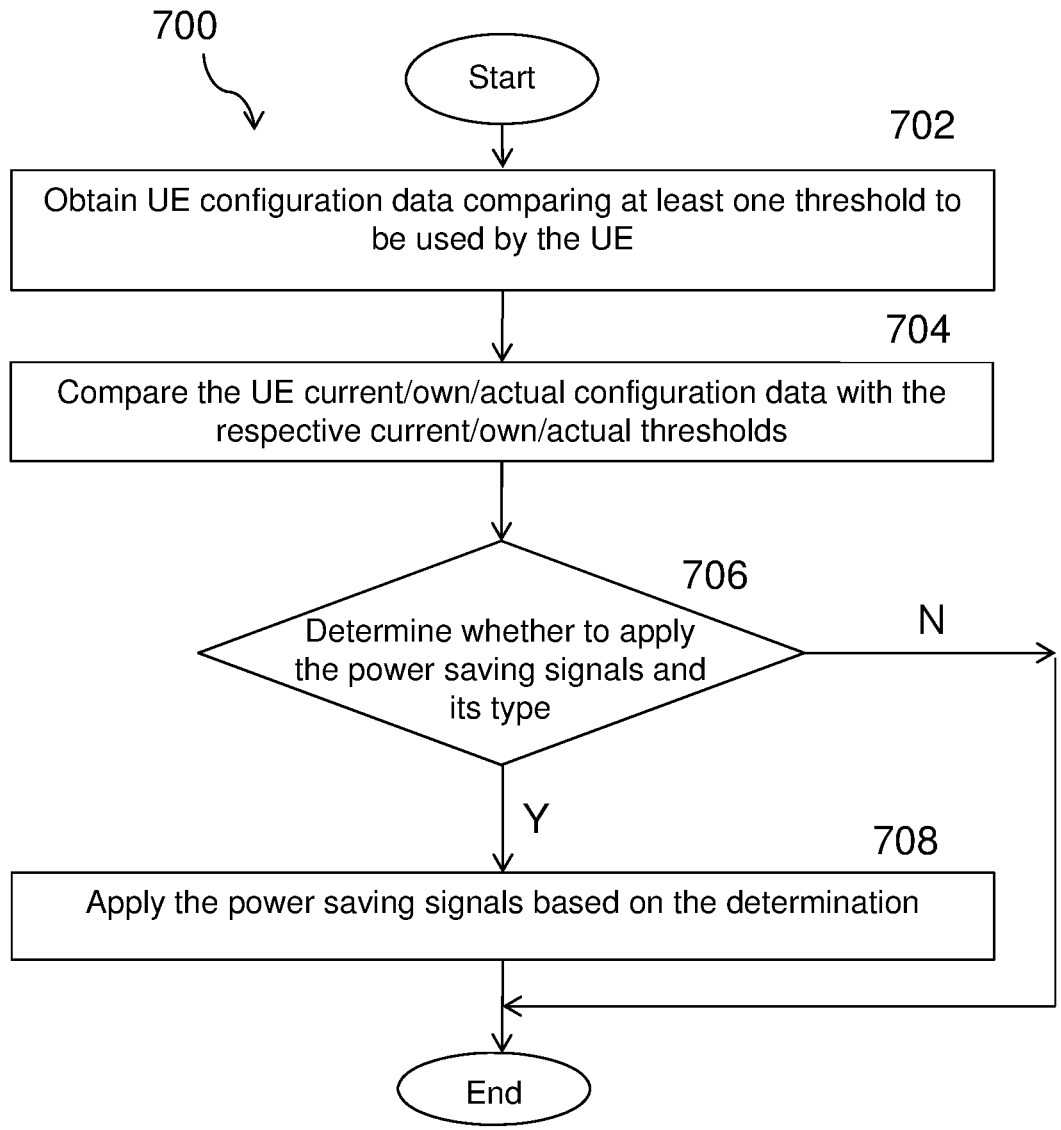
FIG. 9 illustrates an example method by a user equipment (UE) for adaptively monitoring DL control channel in DRX, according to certain embodiments.

FIG. 9 illustrates an example method by a UE for adaptively monitoring DL control channel in DRX, according to certain embodiments. The method may begin at step 702 when the UE 110 obtains UE configuration data comprising at least one threshold to be used by the UE for information on whether the UE is to be configured for applying a power saving signal. The UE may also use the information to select and apply the power saving signal. According to particular embodiments, the power saving signal may include at least one of a WUS and a GTS.

According to certain embodiments, the configuration information is obtained by the UE by means of one or more of the following mechanisms
 by pre-defined rules,
 based on statistics and/or historical data or previously used information for selecting the power saving signal, and
 by receiving from a network node,
The obtained UE configuration data may also include information or threshold on UE activity level, signal level and service/application type as described above with regard to step 304 of FIG. 5a.

At step 704, the UE compares one or more of the UE configuration data with a respective threshold. According to certain embodiments, wireless device 110 compares at least one of a UE activity level and a UE signal level with a corresponding threshold. The comparison may be similar as to that described above with regard to step 306 of FIG. 5a.

At step 706, wireless device 110 determines, based on the comparison, whether or not the UE shall be configured to apply the power saving signal. The determination may be similar to that described above with regard to step 308 of FIG. 5a. According to a particular embodiment, for example, the obtained configuration data may include explicit information on whether to use the power saving signals and/or the signal type. Where the configuration data includes such information, the UE may determine whether to apply the power saving signal based on the information.

At step 708, wireless device 110 applies the power saving signal based on the determination. According to certain embodiments, the UE receives the downlink channels such as, for example, paging or a control channel, according to the determined information. If the determination results in the UE is to apply the WUS or GTS, UE receives the downlink channels, accordingly. On the other hand, if the determined information results in that the UE is not to apply any power saving signals, UE may receive the downlink channel accordingly following the legacy UE behavior.

Figure 10:
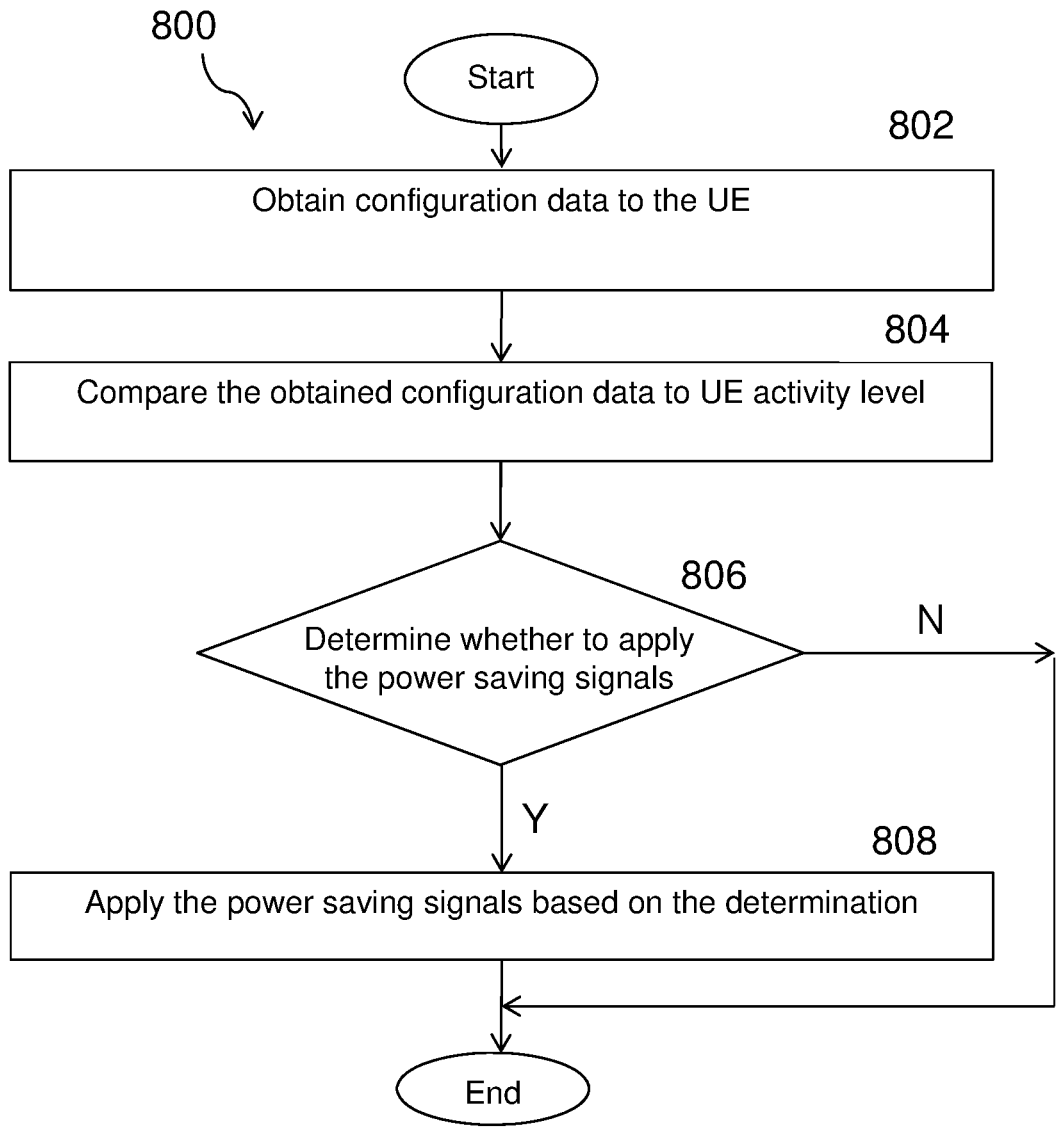
FIG. 10 illustrates an example method by a wireless device for adaptively monitoring DL control channel in DRX, according to certain embodiments.

FIG. 10 illustrates another example method by a UE for adaptively monitoring DL control channel in DRX, according to certain embodiments. The method may begin at step 802 when UE obtains configuration data for the UE. In a particular embodiment, the configuration data may include a parameter. In another example embodiment, the configuration data may include a threshold value.

At step 804, the UE compares the obtained configuration data to a UE activity level. The comparison may be performed as described above with respect to step 306 of FIG. 5a.

At step 806, the UE determines whether to apply the power saving signals. The determination may be performed as described above with respect to step 308 of FIG. 5a. If the UE determines not to apply the power saving signals, the method ends. Conversely, if the UE determines to apply the power saving signals, the method continues to step 808 where the UE applies the power saving signals. The application of the power saving signals may be as described above with respect to step 310 of FIG. 5a.

Figure 11A:
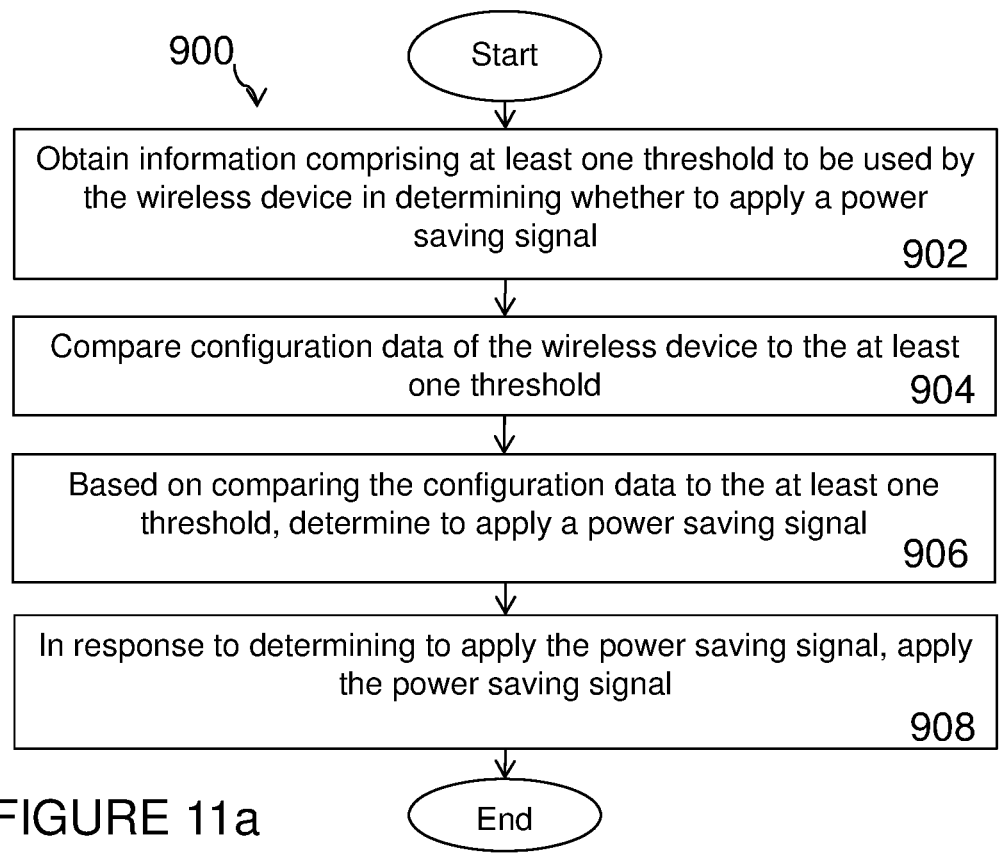
FIG. 11a illustrates another example method by wireless device for adaptively monitoring DL control channel in DRX, according to certain embodiments.

FIG. 11a illustrates another example method by a wireless device 110 for adaptively monitoring DL control channel in DRX, according to certain embodiments. The method may begin at step 902 when wireless device 110 obtains information comprising at least one threshold to be used by the wireless device in determining whether to apply a power saving signal. In a particular embodiment, the information indicates that the wireless device 110 is configured to apply a power saving signal. In another example embodiment, the information indicates that wireless device 110 is expected to be configured to apply a power saving signal. In still another example embodiment, the information may additionally or alternatively indicate that wireless device 110 is capable of applying a power saving signal. For example, in particular embodiments, the information may indicate that the wireless device is configured to, expected to be configured to, or capable of receiving a WUS or GTS.

At step 904, the wireless device 110 compares configuration data of the wireless device 110 to the at least one threshold. According to certain embodiments, the configuration data comprises an activity level of the wireless device, and wireless device 110 may compare the activity level to at least one activity threshold. In a particular embodiment, the activity level may include any one of a DRX cycle configuration, a type of service, and a type of application.

Additionally, or alternatively, the configuration data may include a signal level of the wireless device, and wireless device 110 may compare the signal level to at least one signal level threshold. In a particular embodiment, the signal level may include a coverage level of the wireless device, a received signal level of a signal received at the wireless device such as a RSRP, and/or a transmit signal level of a signal transmitted from the wireless device to the network node.

At step 906, the wireless device 110 determines to apply at least one power saving signal based on the comparison of the configuration data to the at least one threshold. Additionally, wireless device 110 may select the at least one power saving signal to be applied. For example, wireless device 110 may select a WUS or a GTS where the information for the wireless device indicates that the wireless device is capable of receiving a WUS or GTS.

At step 908, the wireless device 110 applies the power saving signal. According to certain embodiments, wireless device 110 may apply the at least one power saving signal to monitor a DL control channel during an On-duration of a DRX cycle. In a particular embodiment, the DL control channel comprises a physical data control channel (PDCCH). In particular embodiments, the applied power saving signal may include at least one of a WUS or a GTS. In response to a WUS, wireless device 110 may monitor the DL control channel in a remaining portion of an On-duration of the DRX cycle, in a particular embodiment. Conversely, in response to the GTS, the wireless device may be transitioned into a sleep state during the On-duration of the DRX cycle, in a particular embodiment, and not be required to monitor the DL control channel during the On-duration of the DRX cycle.

Figure 11B:
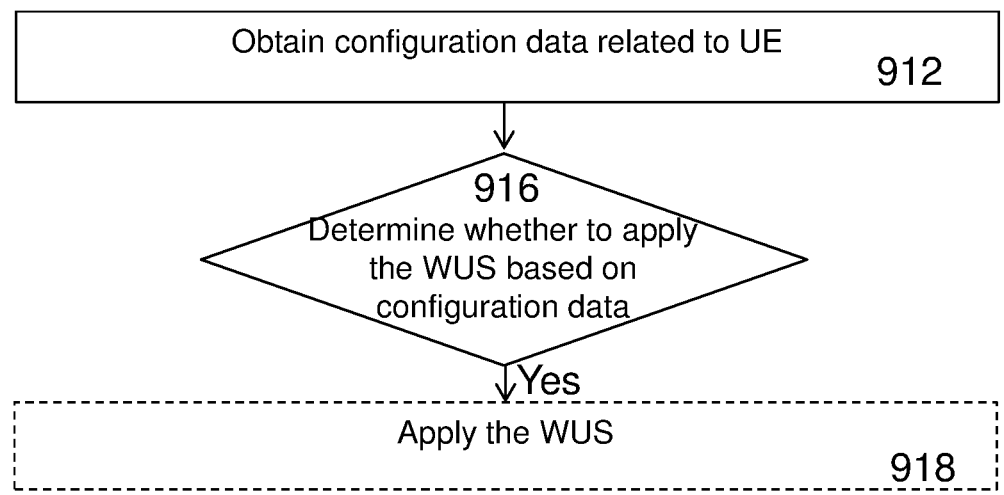
FIG. 11b illustrates another example method by wireless device according to certain embodiments.

FIG. 11b is a flowchart illustrating a method performed by a UE 110 operating in a wireless communication network according to specific embodiments of the invention. The UE is capable of applying a WUS. Applying the WUS implies that reception or non-reception of the WUS at the start of an on-duration of a DRX period indicates to the UE to respectively monitor or refrain from monitoring a downlink control channel during the on-duration. The method illustrated addresses the problem of battery waste for UEs that are used for applications where the UE sleeps most of the time and sends/receives a small amount of data compared to legacy UEs. Examples of such UEs are NB-IoT or MTC UEs. The method enables to configure the UE to monitor the DL data channel only when the network node is expected to schedule the UE to receive data and corresponds to the method in the network node illustrated in FIG. 5b. The method comprises:

912: Obtain configuration data related to the UE, the configuration data comprising at least one of: a DRX cycle configuration; a type of service or application for which the UE is being used; and a UE coverage level. Obtaining the configuration data related to the UE may comprise at least one of: receiving the data from a network node; determining the data based on at least one of statistical data, historical data, or previously used configuration data.

916: Determine whether to apply the WUS, based on the obtained configuration data. The determining whether to apply the WUS may be done based on one or more pre-defined rules. As described with reference to FIG. 5b, the network node may make the corresponding determination based on the same set of pre-defined rules. In an alternative embodiment, the determining whether to apply the WUS comprises determining to apply the WUS when receiving a configuration to apply the WUS from a network node. Determining whether to apply the WUS may comprise one of: a) determining to apply the WUS when a DRX cycle length determined from the DRX cycle configuration exceeds a first threshold; b) determining to apply the WUS when an activity level associated with the type of service or application for which the UE is being used is below a second threshold; c) determining to apply the WUS when the UE coverage level indicates that the UE operates in an enhanced coverage mode.

918 (Optional): The method may further comprise, when determining to apply the WUS, applying the WUS by monitoring the downlink control channel during the on-duration when having received the WUS at the start of the on-duration and refraining from monitoring the downlink control channel during the on-duration otherwise.

In embodiments, the method may further comprise transmitting information to the network node indicating the capability of the UE of applying the WUS. The information indicating the capability of the UE may comprise information indicating at least one of a UE category and a UE capability.

Figure 12:
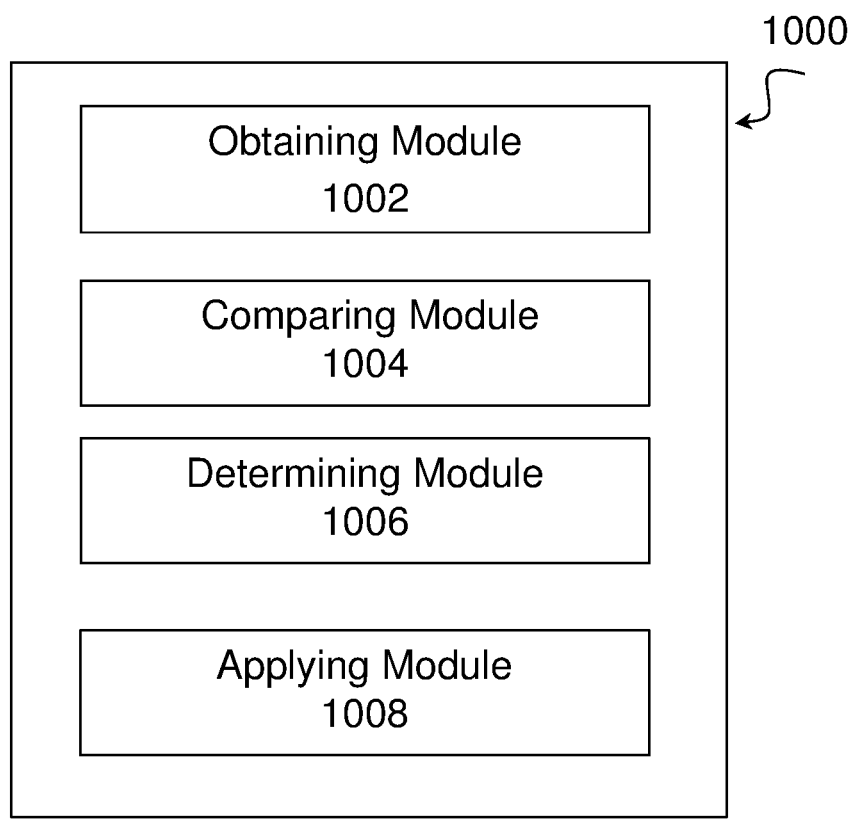
FIG. 12 illustrates another example virtual computing device for adaptively monitoring DL control channel in DRX, according to certain embodiments.

In certain embodiments, the methods for adaptively monitoring DL control channel in DRX as described above may be performed by a virtual computing device. FIG. 12 illustrates an example virtual computing device 1000 for adaptively monitoring DL control channel in DRX, according to certain embodiments. In certain embodiments, virtual computing device 1000 may include modules for performing steps similar to those described above with regard to the methods illustrated and described in FIGS. 9, 10, and 11*a-b*. For example, virtual computing device 1000 may include an obtaining module 1002, a comparing module 1004, a determining module 1006, an applying module 1008, and any other suitable modules for adaptively monitoring DL control channel in DRX. In some embodiments, one or more of the modules may be implemented using processing circuitry 620 of FIG. 8. In certain embodiments, the functions of two or more of the various modules may be combined into a single module.

The obtaining module 1002 may perform certain of the obtaining functions of virtual computing device 1000. For example, in a particular embodiment, obtaining module 1002 may obtain UE configuration data comprising at least one threshold to be used by the UE for information on whether the UE is to be configured for applying a power saving signal.

The comparing module 1004 may perform certain of the comparing functions of virtual computing device 1000. For example, in a particular embodiment, comparing module 1004 may compare configuration data of the wireless device to the at least one threshold. As another example, in a particular embodiment, comparing module 1004 may compare the obtained configuration data to a UE activity level. As another example, comparing module 1004 may compare the UE's current/own actual configuration data with the respective current/own/actual thresholds.

The determining module 1006 may perform certain of the determining functions of virtual computing device 1000. For example, in a particular embodiment, determining module 1006 may determine whether to apply the at least one power saving signal. As another example, in a particular embodiment, determining module 1006 may determine to apply a power saving signal based on the comparison of the configuration data to the at least one threshold. As still another example, determining module 1006 may determine a type of power saving signal to be applied.

The applying module 1008 may perform certain of the applying functions of virtual computing device 1000. For example, in a particular embodiment, applying module 1008 may apply the at least one power saving signal. As another example, in a particular embodiment, applying module 1008 may apply the power saving signal in response to determining to apply the power saving signal.

Other embodiments of virtual computing device 1000 may include additional components beyond those shown in FIG. 12 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Further Examples of Methods and Apparatus

According to certain examples, a method in a network node for adaptively monitoring downlink control channel in discontinuous reception may include:

obtaining information related to at least one power saving signal;

obtaining information related to UE configuration data;

comparing the information related to the UE configuration data to at least one threshold;

determining based on the comparison whether or not to configure the UE to apply the at least one power saving signal; and transmitting a configuration to the UE if it is determined to configure the UE to apply the at least one power saving signal;

optionally, obtaining information related to the at least one power saving signal comprises receiving signaling from the UE that indicates a power saving capability of the UE;

optionally, the signaling is received via RRC signaling;

optionally, obtaining the information related to the at least one power saving signal includes receiving information indicating a type, a category, or an operational mode of the UE and determining a power saving capability of the UE based on the type of the UE, the category, or the operational mode;

optionally, the information related to the power saving signal indicates whether the UE is capable of receiving and/or applying at least one of a wake-up-signal (WUS) or a go-to-sleep (GTS) signal;

optionally, the information related to the at least one power saving signal comprises information identifying whether a UE is configured, expected to be configured, or capable of receiving and/or applying at least one power saving signal, optionally, the at least one power saving signal comprising at least one of a WUS and a GTS;

optionally, the method further includes selecting the at least one power saving signal from a plurality of power saving signals;

optionally, the method further includes selecting one of the WUS and the GTS based on the comparison of the information related to the configuration data to the at least one threshold;

optionally, the configuration configures the UE to apply the at least one power saving signal for monitoring a downlink (DL) control channel during an On-duration of a DRX cycle;

optionally, the DL control channel comprises a physical data control channel (PDCCH);

optionally, the UE configuration data comprises at least one of a UE activity level and a UE signal level;

optionally, the UE activity level comprises at least one of a DRX cycle configuration, a type of service for which the UE is being used, and a type of application for which the UE is being used;

optionally, the UE activity level comprises DRX information received from a third party node, the DRX information identifying a DRX cycle of the UE;

optionally, the UE signal level comprises at least one of a UE coverage level, a UE received signal level at the UE, and a UE transmitted signal received at the network;

optionally, determining based on the comparison whether or not to configure the UE to apply the power saving signal comprises determining to configure the UE to apply the power saving signal;

optionally, transmitting the configuration to the UE if it is determined to configure the UE to apply the power saving signal comprises transmitting the configuration to the UE in response to determining to configure the UE to apply the power saving signal;

optionally, the method further includes periodically transmitting the power saving signal to the UE; and optionally, the method further includes transmitting the power saving signal to the UE on an as needed basis.

According to certain embodiments, a network node may include:

memory storing instructions; and processing circuitry configured to execute the instructions to cause the network node to:

obtain information related to at least one power saving signal;

obtain information related to UE configuration data;

compare the UE configuration data to at least one threshold;

determine based on the comparison whether or not to configure the UE to apply the at least one power saving signal; and transmit a configuration to the UE if it is determined to configure the UE to apply the at least one power saving signal;

optionally, obtaining information related to the at least one power saving signal comprises receiving signaling from the UE that indicates a power saving capability of the UE;

optionally, the signaling is received via RRC signaling;

optionally, obtaining the information related to the at least one power saving signal comprises receiving information indicating a type, a category, or an operational mode of the UE and determining a power saving capability of the UE based on the type of the UE, the category, or the operational mode;

optionally, the information related to the power saving signal indicates whether the UE is capable of receiving and/or applying at least one of a wake-up-signal (WUS) or a go-to-sleep (GTS) signal;

optionally, the information related to the at least one power saving signal comprises information identifying whether a UE is configured, expected to be configured, or capable of receiving and/or applying at least one power saving signal, optionally, the at least one power saving signal comprising at least one of a WUS and a GTS;

optionally, the processing circuitry is further configured to select the at least one power saving signal from a plurality of power saving signals;

optionally, the processing circuitry is further configured to select one of the WUS and the GTS based on the comparison of the UE configuration data to the at least one threshold;

optionally, the configuration configures the UE to apply the at least one power saving signal for monitoring a downlink (DL) control channel during an On-duration of a DRX cycle;

optionally, the DL control channel comprises a physical data control channel (PDCCH);

optionally, the UE configuration data comprises at least one of a UE activity level and a UE signal level;

optionally, the UE activity level comprises at least one of a DRX cycle configuration, a type of service for which the UE is being used, and a type of application for which the UE is being used;

optionally, the UE activity level comprises DRX information received from a third party node, the DRX information identifying a DRX cycle of the UE;

optionally, the UE signal level comprises at least one of a UE coverage level, a UE received signal level at the UE, and a UE transmitted signal received at the network;

optionally, determining based on the comparison whether or not to configure the UE to apply the power saving signal comprises determining to configure the UE to apply the power saving signal;

optionally, transmitting the configuration to the UE if it is determined to configure the UE to apply the power saving signal comprises transmitting the configuration to the UE in response to determining to configure the UE to apply the power saving signal;

optionally, the processing circuitry is further configured to periodically transmit the power saving signal to the UE; and optionally, the processing circuitry is further configured to select the power saving signal to the UE on an as needed basis.

According to certain examples, a method in a network node adaptively monitoring downlink control channel in discontinuous reception may include:

obtaining information associated with a wireless device, the information relating to a power saving capability of the wireless device;

comparing configuration data associated with the wireless device to at least one threshold;

based on the comparing of the configuration data to the at least one threshold, determining to configure the wireless device to apply a power saving signal; and in response to determining to configure the wireless device to apply the power saving signal, transmitting a power configuration to the wireless device;

optionally, obtaining information related to the power saving capability comprises receiving signaling from the wireless device that indicates a power saving capability of the wireless device;

optionally, the signaling is received via RRC signaling;

optionally, obtaining the information related to the power saving capability comprises receiving information indicating a type, a category, or an operational mode of the wireless device and determining the power saving capability of the wireless device based on the type of the wireless device, the category, or the operational mode;

optionally, the information relating to a power saving capability of the wireless device indicates whether the wireless device is capable of receiving and/or applying at least one of a wake-up-signal (WUS) or a go-to-sleep (GTS) signal;

optionally, the configuration configures the wireless device to apply the at least one power saving signal for monitoring a downlink (DL) control channel during an On-duration of a DRX cycle;

optionally, the DL control channel comprises a physical data control channel (PDCCH);

optionally, the power configuration comprises a parameter associated with power saving;

optionally, the power configuration comprises a threshold associated with power saving;

optionally, the power saving signal is associated with or corresponds to the power saving capability of the wireless device as indicated in the received information;

optionally, the information relating to a power saving capability of the wireless device comprises information indicating that the wireless device is configured to receive and/or apply a power saving signal;

optionally, the information comprises information indicating that the wireless device is expected to be configured to receive and/or apply a power saving signal;

optionally, the information comprises information indicating that the wireless device is capable of receiving and/or applying a power saving signal;

optionally, the method further includes selecting the at least one power saving signal from a plurality of power saving signals;

optionally, the signal comprises a wake-up signal (WUS);

optionally, the power saving signal comprises a go-to-sleep signal (GTS);

optionally, the method further includes selecting one of the WUS and the GTS based on the UE configuration data;

optionally, the configuration data comprises an activity level of the wireless device and the at least one threshold comprises an activity threshold;

optionally, the activity level comprises a DRX cycle configuration;

optionally, the UE activity level comprises DRX information received from a third party node, the DRX information identifying a DRX cycle of the UE optionally, the activity level comprises a type of service;

optionally, the activity level comprises a type of application;

optionally, the configuration data comprises a signal level of the wireless device and the at least one threshold comprises a signal level threshold;

optionally, the signal level comprises a coverage level of the wireless device;

optionally, the signal level comprises a received signal level of a signal received at the wireless device;

optionally, the received signal level comprises a reference signal receive power (RSRP) measurement taken at the wireless device;

optionally, the signal level comprises a transmit signal level of a signal transmitted from the wireless device to the network node;

optionally, the method further includes periodically transmitting the power saving signal to the UE; and optionally, the method further includes transmitting the power saving signal to the UE on an as needed basis.

According to certain examples, a network node for adaptively monitoring downlink control channel in discontinuous reception may include:

memory storing instructions; and processing circuitry configured to execute the instructions to cause the network node to:

obtaining information associated with a wireless device, the information relating to a power saving capability of the wireless device;

comparing configuration data associated with the wireless device to at least one threshold;

based on the comparing of the configuration data to the at least one threshold, determining to configure the wireless device to apply a power saving signal; and in response to determining to configure the wireless device to apply the power saving signal, transmitting a power configuration to the wireless device;

optionally, obtaining information related to the power saving capability comprises receiving signaling from the wireless device that indicates a power saving capability of the wireless device;

optionally, the signaling is received via RRC signaling;

optionally, obtaining the information related to the power saving capability comprises receiving information indicating a type, a category, or an operational mode of the wireless device and determining the power saving capability of the wireless device based on the type of the wireless device, the category, or the operational mode;

optionally, the information relating to a power saving capability of the wireless device indicates whether the wireless device is capable of receiving and/or applying at least one of a wake-up-signal (WUS) or a go-to-sleep (GTS) signal;

optionally, the configuration configures the wireless device to apply the at least one power saving signal for monitoring a downlink (DL) control channel during an On-duration of a DRX cycle;

optionally, the DL control channel comprises a physical data control channel (PDCCH);

optionally, the power configuration comprises a parameter associated with power saving;

optionally, the power configuration comprises a threshold associated with power saving;

optionally, the power saving signal is associated with or corresponds to the power saving capability of the wireless device as indicated in the received information;

optionally, the information relating to a power saving capability of the wireless device comprises information indicating that the wireless device is configured to receive and/or apply a power saving signal;

optionally, the information comprises information indicating that the wireless device is expected to be configured to receive and/or apply a power saving signal;

optionally, the information comprises information indicating that the wireless device is capable of receiving and/or applying a power saving signal;

optionally, the method further includes selecting the at least one power saving signal from a plurality of power saving signals;

optionally, the signal comprises a wake-up signal (WUS);

optionally, the power saving signal comprises a go-to-sleep signal (GTS);

optionally, the method further includes selecting one of the WUS and the GTS based on the UE configuration data;
optionally, the configuration data comprises an activity level of the wireless device and the at least one threshold comprises an activity threshold;
  optionally, the activity level comprises a DRX cycle configuration;
  optionally, the UE activity level comprises DRX information received from a third party node, the DRX information identifying a DRX cycle of the UE
  optionally, the activity level comprises a type of service;
  optionally, the activity level comprises a type of application;
optionally, the configuration data comprises a signal level of the wireless device and the at least one threshold comprises a signal level threshold;
  optionally, the signal level comprises a coverage level of the wireless device;
  optionally, the signal level comprises a received signal level of a signal received at the wireless device;
    optionally, the received signal level comprises a reference signal receive power (RSRP) measurement taken at the wireless device;
  optionally, the signal level comprises a transmit signal level of a signal transmitted from the wireless device to the network node;
optionally, the processing circuitry is configured to periodically transmit the power saving signal to the UE; and
optionally, the processing circuitry is configured to transmit the power saving signal to the UE on an as needed basis.

According to certain examples, method in a user equipment (UE) for adaptively monitoring downlink control channel in discontinuous reception may include:
  obtaining UE configuration data comprising at least one threshold to be used by the UE;
  comparing UE configuration data to the at least one threshold;
  determining whether to apply at least one power saving signal and a type of the power saving signal;
  applying the at least one power saving signal based on the determination;
  optionally, the at least one threshold comprises information relating to whether the UE is whether the UE is configured to receive and/or apply the at least one power saving signal, expected to be configured to receive and/or apply the at least one power saving signal, or capable of receiving and/or applying the at least one power saving signal;
  optionally, the at least one power saving signal is at least one of a wake-up-signal (WUS) and a go-to-sleep signal (GTS);
  optionally, the method further includes selecting the at least one power saving signal from a plurality of power saving signals;
  optionally, the method further includes selecting one of the WUS and the GTS based on the UE configuration data;
  optionally, the method further includes applying the at least one power saving signal to monitor a downlink (DL) control channel during an On-duration of a DRX cycle;
  optionally, the DL control channel comprises a physical data control channel (PDCCH);
  optionally, the method further includes receiving a GTS and, in response to the GTS, transitioning the UE to a sleep state during an On-duration of a DRX cycle;
  optionally, the method further includes receiving a WUS and, in response to the WUS, monitoring a DL control channel in a remaining portion of an On-duration of a DRX cycle;
  optionally, the UE configuration data is a UE activity level;
  optionally, comparing the UE configuration data to the at least one threshold comprises comparing the UE activity level to a UE activity threshold;
  optionally, the UE activity level comprises or is associated with at least one of a DRX configuration, a type of service or a type of application;
  optionally, the UE configuration data is a UE signal level;
  optionally, comparing the UE configuration data to the at least one threshold comprises comparing the UE signal level to a UE signal level threshold;
  optionally, the UE signal level comprises at least one of a UE coverage level, a UE received signal level at the UE, and a UE transmitted signal received at the network;

According to certain examples, a user equipment (UE) for adaptively monitoring downlink control channel in discontinuous reception may include:
  memory storing instructions; and
  processing circuitry configured to execute the instructions to cause the network node to:
    obtain UE configuration data comprising at least one threshold to be used by the UE;
    compare UE configuration data to the at least one threshold;
    determine whether to apply at least one power saving signal and a type of the power signal;
    apply the at least one power saving signal based on the determination;
    optionally, the at least one threshold comprises information relating to whether the UE is configured to receive and/or apply the at least one power saving signal, expected to be configured to receive and/or apply the at least one power saving signal, or capable of receiving and/or applying the at least one power saving signal;
    optionally, the at least one power saving signal is at least one of a wake-up-signal (WUS) and a go-to-sleep signal (GTS);
    optionally, the method further includes selecting the at least one power saving signal from a plurality of power saving signals;
    optionally, the method further includes selecting one of the WUS and the GTS based on the UE configuration data;
    optionally, the method further includes applying the at least one power saving signal to monitor a downlink (DL) control channel during an On-duration of a DRX cycle;
    optionally, the DL control channel comprises a physical data control channel (PDCCH);
    optionally, the method further includes receiving a GTS and, in response to the GTS, transitioning the UE to a sleep state during an On-duration of a DRX cycle;

optionally, the method further includes receiving a WUS and, in response to the WUS, monitoring a DL control channel in a remaining portion of an On-duration of a DRX cycle;

optionally, the UE configuration data is a UE activity level;

optionally, comparing the UE configuration data to the at least one threshold comprises comparing the UE activity level to a UE activity threshold;

optionally, the UE activity level comprises or is associated with at least one of a DRX configuration, a type of service or a type of application;

optionally, the UE configuration data is a UE signal level;

optionally, comparing the UE configuration data to the at least one threshold comprises comparing the UE signal level to a UE signal level threshold;

optionally, the UE signal level comprises at least one of a UE coverage level, a UE received signal level at the UE, and a UE transmitted signal received at the network;

According to certain examples, a method in a user equipment (UE) for adaptively monitoring downlink control channel in discontinuous reception may include:

obtaining UE configuration data comprising at least one threshold or parameter to be used by the UE;

comparing the UE configuration data to a UE activity level;

determining whether to apply at least one power saving signal by determining if a condition is fulfilled;

if the condition is fulfilled, applying the at least one power saving signal;

if the condition is not fulfilled, not applying the at least one power saving signal.

optionally, the at least one threshold comprises information relating to whether the UE is configured to receive and/or apply the at least one power saving signal, expected to be configured to receive and/or apply the at least one power saving signal, or capable of receiving and/or applying the at least one power saving signal;

optionally, the method further includes selecting the at least one power saving signal from a plurality of power saving signals;

optionally, the at least one power saving signal is at least one of a wake-up-signal (WUS) and a go-to-sleep signal (GTS);

optionally, the method further includes selecting one of the WUS and the GTS based on the UE configuration data;

optionally, the method further includes applying the at least one power saving signal to monitor a downlink (DL) control channel during an On-duration of a DRX cycle;

optionally, the DL control channel comprises a physical data control channel (PDCCH);

optionally, the method further includes receiving a GTS and, in response to the GTS, transitioning the UE to a sleep state during an On-duration of a DRX cycle;

optionally, the method further includes receiving a WUS and, in response to the WUS, monitoring a DL control channel in a remaining portion of an On-duration of a DRX cycle;

optionally, comparing the UE configuration data to the UE activity level comprises comparing a UE activity threshold to the UE activity level;

optionally, the UE activity level comprises or is associated with at least one of a DRX configuration, a type of service or a type of application;

optionally, the method further includes comparing the UE configuration data to a UE signal level optionally, comparing the UE configuration data to a UE signal level comprises comparing a UE signal level threshold to the UE signal level;

optionally, the UE signal level comprises at least one of a UE coverage level, a UE received signal level at the UE, and a UE transmitted signal received at the network;

According to certain examples, a user equipment (UE) for adaptively monitoring downlink control channel in discontinuous reception may include:

memory storing instructions; and processing circuitry configured to execute the instructions to cause the network node to:

obtain UE configuration data comprising at least one threshold or parameter to be used by the UE;

compare the UE configuration data to a UE activity level;

determine whether to apply at least one power saving signal by determining if a condition is fulfilled;

if the condition is fulfilled, apply the at least one power saving signal;

if the condition is not fulfilled, not apply the at least one power saving signal.

optionally, the at least one threshold comprises information relating to whether the UE is whether the UE is configured to receive and/or apply the at least one power saving signal, expected to be configured to receive and/or apply the at least one power saving signal, or capable of receiving and/or applying the at least one power saving signal;

optionally, the processing circuitry is further configured to select the at least one power saving signal from a plurality of power saving signals;

optionally, the at least one power saving signal is at least one of a wake-up-signal (WUS) and a go-to-sleep signal (GTS);

optionally, the processing circuitry is further configured to select one of the WUS and the GTS based on the UE configuration data;

optionally, the processing circuitry is further configured to apply the at least one power saving signal to monitor a downlink (DL) control channel during an On-duration of a DRX cycle;

optionally, the DL control channel comprises a physical data control channel (PDCCH);

optionally, the processing circuitry is further configured to receive a GTS and, in response to the GTS, transitioning the UE to a sleep state during an On-duration of a DRX cycle;

optionally, the processing circuitry is further configured to receive a WUS and, in response to the WUS, monitoring a DL control channel in a remaining portion of an On-duration of a DRX cycle;

optionally, comparing the UE configuration data to the UE activity level comprises comparing a UE activity threshold to the UE activity level;

optionally, the UE activity level comprises or is associated with at least one of a DRX configuration, a type of service or a type of application;

optionally, the processing circuitry is further configured to compare the UE configuration data to a UE signal level optionally, comparing the UE configuration data to a UE signal level comprises comparing a UE signal level threshold to the UE signal level;

optionally, the UE signal level comprises at least one of a UE coverage level, a UE received signal level at the UE, and a UE transmitted signal received at the network;

According to certain examples, a method in a wireless device for adaptively monitoring downlink control channel in discontinuous reception may include obtaining information comprising at least one threshold to be used by the wireless device in determining whether to apply a power saving signal;

comparing configuration data of the wireless device to the at least one threshold;

based on comparing the configuration data to the at least one threshold, determining to apply a power saving signal;

in response to determining to apply the power saving signal, applying the power saving signal;

optionally, the method further includes applying the at least one power saving signal to monitor a downlink (DL) control channel during an On-duration of a DRX cycle;

optionally, the DL control channel comprises a physical data control channel (PDCCH);

optionally, the information comprising the at least one threshold indicates that the wireless device is configured to receive and/or apply a power saving signal;

optionally, the information comprising the at least one threshold indicates that the wireless device is expected to be configured to receive and/or apply a power saving signal;

optionally, the information comprising the at least one threshold indicates that the wireless device is capable of receiving and/or applying a power saving signal;

optionally, the method further includes selecting the at least one power saving signal from a plurality of power saving signals;

optionally, the power saving signal comprises a wake-up signal (WUS);

optionally, the power saving signal comprises a go-to-sleep signal (GTS);

optionally, the method further includes selecting the power saving signal from a plurality of power saving signals;

optionally, the method further includes selecting one of the WUS and the GTS based on the UE configuration data;

optionally, the method further includes receiving a GTS and, in response to the GTS, transitioning the UE to a sleep state during an On-duration of a DRX cycle;

optionally, the method further includes receiving a WUS and, in response to the WUS, monitoring a DL control channel in a remaining portion of an On-duration of a DRX cycle;

optionally, the configuration data comprises an activity level of the wireless device and the at least one threshold comprises an activity threshold;

optionally, the activity level comprises a DRX cycle configuration;

optionally, the activity level comprises a type of service;

optionally, the activity level comprises a type of application;

optionally, the configuration data comprises a signal level of the wireless device and the at least one threshold comprises a signal level threshold;

optionally, the signal level comprises a coverage level of the wireless device;

optionally, the signal level comprises a received signal level of a signal received at the wireless device;

optionally, the received signal level comprises a reference signal receive power (RSRP) measurement taken at the wireless device;

optionally, the signal level comprises a transmit signal level of a signal transmitted from the wireless device to the network node;

optionally, the method further includes receiving a power saving signal, determining whether the power saving signal is intended for the wireless device, and applying the power saving signal if the power saving signal is intended for the wireless device;

optionally, the power saving signal is received on a periodic basis; and optionally, the power saving signal is received on an as-needed basis.

According to certain examples, a wireless device for adaptively monitoring downlink control channel in discontinuous reception may include:

memory storing instructions; and processing circuitry configured to execute the instructions to cause the network node to:

obtain information comprising at least one threshold to be used by the wireless device in determining whether to apply a power saving signal;

compare configuration data of the wireless device to the at least one threshold;

based on comparing the configuration data to the at least one threshold, determine to apply a power saving signal;

in response to determining to apply the power saving signal, apply the power saving signal;

optionally, the processing circuitry is further configured to apply the at least one power saving signal to monitor a downlink (DL) control channel during an On-duration of a DRX cycle;

optionally, the DL control channel comprises a physical data control channel (PDCCH);

optionally, the information comprising the at least one threshold indicates that the wireless device is configured to receive and/or apply a power saving signal;

optionally, the information comprising the at least one threshold indicates that the wireless device is expected to be configured to receive and/or apply a power saving signal;

optionally, the information comprising the at least one threshold indicates that the wireless device is capable of receiving and/or applying a power saving signal;

optionally, the processing circuitry is further configured to select the at least one power saving signal from a plurality of power saving signals;

optionally, the power saving signal comprises a wake-up signal (WUS);

optionally, the power saving signal comprises a go-to-sleep signal (GTS);

optionally, the processing circuitry is further configured to select the power saving signal from a plurality of power saving signals;

optionally, the processing circuitry is further configured to select one of the WUS and the GTS based on the UE configuration data;

optionally, the processing circuitry is further configured to receive a GTS and, in response to the GTS, transitioning the UE to a sleep state during an On-duration of a DRX cycle;

optionally, the processing circuitry is further configured to receive a WUS and, in response to the WUS, monitoring a DL control channel in a remaining portion of an On-duration of a DRX cycle;

optionally, the configuration data comprises an activity level of the wireless device and the at least one threshold comprises an activity threshold;

optionally, the activity level comprises a DRX cycle configuration;

optionally, the activity level comprises a type of service;

optionally, the activity level comprises a type of application;

optionally, the configuration data comprises a signal level of the wireless device and the at least one threshold comprises a signal level threshold;

optionally, the signal level comprises a coverage level of the wireless device;

optionally, the signal level comprises a received signal level of a signal received at the wireless device;

optionally, the received signal level comprises a reference signal receive power (RSRP) measurement taken at the wireless device;

optionally, the signal level comprises a transmit signal level of a signal transmitted from the wireless device to the network node;

optionally, the processing circuitry is further configured to receive a power saving signal, determining whether the power saving signal is intended for the wireless device, and applying the power saving signal if the power saving signal is intended for the wireless device;

optionally, the power saving signal is received on a periodic basis; and optionally, the power saving signal is received on an as-needed basis.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the appended claims.

The invention claimed is:

1. A method performed by a network node of a wireless communication network, the method comprising:

obtaining information indicating a capability of a User Equipment (UE) of applying power saving signals, wherein the power saving signals comprises two types of signals, a first type being a wake-up-signal (WUS) and the second type being a go-to-sleep signal (GTS), wherein applying the WUS or the GTS implies that:

reception of the WUS at the start of an on-duration of a discontinuous reception (DRX) period indicates to the UE to monitor a downlink control channel during the on-duration, and non-reception of the WUS at the start of the on-duration of the DRX period indicates to the UE to refrain from monitoring the downlink control channel during the on-duration, reception of the GTS at the start of an on-duration of a discontinuous reception, DRX, period indicates to the UE to refrain from monitoring a downlink control channel during the on-duration, and non-reception of the GTS at the start of the on-duration of the DRX period indicates to the UE to monitor the downlink control channel during the on-duration, obtaining configuration data related to the UE, the configuration data comprising at least one of: a DRX cycle configuration; a type of service or application for which the UE is being used; and a UE coverage level, determining whether the UE is to apply the WUS or the GTS based on the obtained configuration data, wherein determining whether the UE is to apply the WUS or the GTS comprises one of:

determining that the UE is to apply the WUS when a DRX cycle length determined from the DRX cycle configuration exceeds a first threshold (Ha2) and to apply GTS otherwise, and determining that the UE is to apply the WUS when the UE coverage level indicates that the UE operates in an enhanced coverage mode and to apply GTS when the UE coverage level indicates that the UE operates in a normal coverage mode.

2. The method according to claim 1, wherein the determining whether the UE is to apply the WUS or the GTS is done based on one or more pre-defined rules.

3. The method according to claim 1, the method further comprising in response to determining that the UE is to apply the WUS:

configuring the UE to apply the WUS, and in response to determining that the UE is to apply the GTS, configuring the UE to apply the GTS.

4. The method according to claim 1, wherein obtaining information indicating the capability of the UE comprises determining the capability of the UE based on at least one of: an operational coverage mode of the UE; information indicating at least one of a UE category and a UE capability.

5. The method according to claim 4, wherein the information indicating at least one of a UE category and a UE capability is received from the UE.

6. The method according to claim 1, wherein obtaining the configuration data related to the UE comprises receiving the data from another network node.

7. A method performed by a user equipment (UE) operating in a wireless communication network, the UE being capable of applying power saving signals, wherein the power saving signals comprises two types of signals, a first type being a wake-up-signal (WUS) and the second type being a go-to-sleep signal (GTS), the method comprising:

obtaining configuration data related to the UE, the configuration data comprising at least one of: a discontinuous reception (DRX) cycle configuration; a type of service or application for which the UE is being used; and a UE coverage level, and determining whether to apply the WUS or GTS, based on the obtained configuration data, wherein determining whether to apply the WUS or the GTS comprises one of:
  determining to apply the WUS when a DRX cycle length determined from the DRX cycle configuration exceeds a first threshold (Ha2) and to apply GTS otherwise, and
  determining to apply the WUS when the UE coverage level indicates that the UE operates in an enhanced coverage mode and to apply GTS when the UE coverage level indicates that the UE operates in a normal coverage mode, and
wherein applying the WUS or GTS comprises:
  based on reception of the WUS at the start of an on-duration of the DRX period, monitoring the downlink control channel during the on-duration,
  based on non-reception of the WUS at the start of the on-duration of the DRX period, refraining from monitoring the downlink control channel during the on-duration,
  based on reception of the GTS at the start of an on-duration of a DRX period, refraining from monitoring a downlink control channel during the on-duration, and
  based on non-reception of the GTS at the start of the on-duration of the DRX period, monitoring the downlink control channel during the on-duration.

8. The method according to claim 7, wherein the determining whether to apply the WUS or the GTS is done based on one or more pre-defined rules.

9. The method according to claim 7, wherein the determining whether to apply the WUS or the GTS comprises:
  determining to apply the WUS when receiving a configuration to apply the WUS from a network node; and
  determining to apply the GTS when receiving a configuration to apply the GTS from the network node.

10. The method according to claim 7, further comprising transmitting information to the network node indicating the capability of the UE of applying the power saving signals.

11. The method according to claim 10, wherein the information indicating the capability of the UE comprises information indicating at least one of a UE category and a UE capability.

12. The method according to claim 7, wherein obtaining the configuration data related to the UE comprises at least one of: receiving the data from a network node; determining the data based on at least one of statistical data, historical data, or previously used configuration data.

13. A network node of a wireless communication network, the network node comprising a processing circuitry and a memory, the memory containing instructions executable by the processing circuitry whereby the node is configured to:
  obtain information indicating a capability of a User Equipment (UE) of applying power saving signals, wherein the power saving signals comprises two types of signals, a first type being a wake-up-signal (WUS) and the second type being a go-to-sleep signal (GTS), wherein applying the WUS or GTS implies that:
    reception of the WUS at the start of an on-duration of a discontinuous reception (DRX) period indicates to the UE to monitor a downlink control channel during the on-duration, and
    non-reception of the WUS at the start of the on-duration of the DRX period indicates to the UE to refrain from monitoring the downlink control channel during the on-duration,
    reception of the GTS at the start of an on-duration of a discontinuous reception, DRX, period indicates to the UE to refrain from monitoring a downlink control channel during the on-duration, and
    non-reception of the GTS at the start of the on-duration of the DRX period indicates to the UE to monitor the downlink control channel during the on-duration,
  obtain configuration data related to the UE, the configuration data comprising at least one of: a DRX cycle configuration; a type of service or application for which the UE is being used; and a UE coverage level,
  determine whether the UE is to apply the WUS or the GTS based on the obtained configuration data, wherein determining whether the UE is to apply the WUS or the GTS comprises one of:
  determining that the UE is to apply the WUS when a DRX cycle length determined from the DRX cycle configuration exceeds a first threshold (Ha2) and to apply GTS otherwise, and
  determining that the UE is to apply the WUS when the UE coverage level indicates that the UE operates in an enhanced coverage mode and to apply GTS when the UE coverage level indicates that the UE operates in a normal coverage mode.

14. The network node according to claim 13, wherein the node is configured to determine whether the UE is to apply the WUS or the GTS based on one or more pre-defined rules.

15. A user equipment, UE, configured to operate in a wireless communication network, the UE being capable of applying power saving signals, wherein the power saving signals comprises two types of signals, a first type being a wake-up-signal (WUS) and the second type being a go-to-sleep signal (GTS), the UE comprising a processing circuitry and a memory, the memory containing instructions executable by the processing circuitry whereby the UE is configured to:
  obtain configuration data related to the UE, the configuration data comprising at least one of: a discontinuous reception (DRX) cycle configuration; a type of service or application for which the UE is being used; and a UE coverage level, and
  determine whether to apply the WUS or the GTS based on the obtained configuration data, wherein determining whether to apply the WUS or the GTS comprises one of:
  determining to apply the WUS when a DRX cycle length determined from the DRX cycle configuration exceeds a first threshold (Ha2) and to apply GTS otherwise, and
  determining to apply the WUS when the UE coverage level indicates that the UE operates in an enhanced coverage mode and to apply GTS when the UE coverage level indicates that the UE operates in a normal coverage mode, and
wherein applying the WUS or the GTS comprises:
  based on reception of the WUS at the start of an on-duration of the DRX period, monitoring the downlink control channel during the on-duration, and
  based on non-reception of the WUS at the start of the on-duration of the DRX period, refraining from monitoring the downlink control channel during the on-duration,
  based on reception of the GTS at the start of an on-duration of a DRX period, refraining from monitoring a downlink control channel during the on-duration, and based on non-reception of the GTS at the start of the on-duration of the DRX period, monitoring the downlink control channel during the on-duration.

16. The UE according to claim 15, wherein the UE is configured to apply the WUS or the GTS based on one or more pre-defined rules.

* * * * *